(12) United States Patent
Kim et al.

(10) Patent No.: US 10,669,664 B2
(45) Date of Patent: Jun. 2, 2020

(54) WASHING APPARATUS AND CONTROLLING METHOD THEREOF

(71) Applicant: Samsung Electronics Co., Ltd, Gyeonggi-do (KR)

(72) Inventors: Tae-Kil Kim, Gyeonggi-do (KR); Young Jin Um, Gyeonggi-do (KR); Kyu Nam Lee, Gyeonggi-do (KR); Sung Mo Lee, Gyeonggi-do (KR); Seung Hun Lee, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 301 days.

(21) Appl. No.: 15/172,084

(22) Filed: Jun. 2, 2016

(65) Prior Publication Data
US 2016/0355967 A1 Dec. 8, 2016

(30) Foreign Application Priority Data
Jun. 2, 2015 (KR) ............ 10-2015-0077870

(51) Int. Cl.
| | |
|---|---|
| D06F 37/40 | (2006.01) |
| D06F 35/00 | (2006.01) |
| D06F 37/30 | (2020.01) |
| D06F 23/04 | (2006.01) |
| D06F 37/38 | (2006.01) |
| D06F 33/02 | (2006.01) |

(52) U.S. Cl.
CPC ............ *D06F 37/40* (2013.01); *D06F 35/005* (2013.01); *D06F 37/30* (2013.01); *D06F 37/304* (2013.01); *D06F 23/04* (2013.01); *D06F 33/02* (2013.01); *D06F 37/38* (2013.01); *D06F 2202/12* (2013.01); *D06F 2204/06* (2013.01); *D06F 2220/00* (2013.01); *D06F 2232/08* (2013.01)

(58) Field of Classification Search
CPC ................................. D06F 37/30–40
See application file for complete search history.

(56) References Cited

U.S. PATENT DOCUMENTS

2003/0177794 A1* 9/2003 Yoon ...................... D06F 37/40
68/12.01

FOREIGN PATENT DOCUMENTS

KR 10-2011-0013062 2/2011

OTHER PUBLICATIONS

KR20110013062A Machine Translation (Year: 2011).*
KR20110013062A Machine Translation of Figure 4 (Year: 2011).*

* cited by examiner

*Primary Examiner* — Spencer E Bell

(57) ABSTRACT

In accordance with an aspect of the present disclosure, a washing apparatus including a main motor configured to generate a rotational force and provide the rotational force to a washing shaft; a coupling disposed above the main motor and selectively transmitting the rotational force of the main motor to a spin-drying shaft by vertically moving; a clutch motor configured to generate a tensile force in a radial direction of the coupling; a clutch lever configured to decouple the main motor from the coupling by moving the coupling upward using the tensile force of the clutch motor; and a controller configured to rotate the main motor in a mode switching section from a spin-drying mode, in which the coupling is coupled to the main motor, to a washing mode, in which the coupling is decoupled from the main motor, or from the washing mode to the spin-drying mode.

18 Claims, 32 Drawing Sheets

WASHING APPARATUS AND CONTROLLING METHOD THEREOF

CROSS-REFERENCE TO RELATED APPLICATION(S)

This application claims the benefit of Korean Patent Application No. 10-2015-0077870, filed on Jun. 2, 2015 in the Korean Intellectual Property Office, the disclosure of which is incorporated herein by reference.

TECHNICAL FIELD

This application claims the benefit of Korean Patent Application No. 2015-0077870, filed on Jun. 2, 2015 in the Korean Intellectual Property Office, the disclosure of which is incorporated herein by reference.

BACKGROUND

In general, washing apparatuses, which are used to wash clothes using frictional force between the clothes and water, are classified into front-loading type washing apparatuses and top-loading type washing apparatuses.

A top-loading type washing apparatus includes a pulsator configured to generate a water stream at the bottom of a rotary tub, which contains clothes, together with the rotary tub, washes the clothes using the water stream generated by the pulsator, and spin-dries the clothes using centrifugal force generated by rotating the rotary tub.

The pulsator of the top-loading type washing apparatus rotates both in a washing mode and a spin-drying mode, and the rotary tub rotates only in the spin-drying mode. Since the top-loading type washing apparatus includes a coupling selectively transmitting rotational force to the rotary tub and a clutch assembly moving the coupling, the close may be entangled causing a noise when a position of the coupling is switched.

SUMMARY

Therefore, it is an aspect of the present disclosure to provide a washing apparatus that reduces a noise generated while a position of a coupling is switched by controlling a driving point of time of a main motor, which provides rotational force to a washing shaft and a spin-drying shaft, during mode switching between a washing mode and a spin-drying mode, and a controlling method thereof.

Additional aspects of the disclosure will be set forth in part in the description which follows and, in part, will be obvious from the description, or may be learned by practice of the disclosure.

In accordance with an aspect of the present disclosure, a washing apparatus comprising: a main motor configured to generate a rotational force and provide the rotational force to a washing shaft; a coupling disposed above the main motor and configured to selectively transmit the rotational force of the main motor to a spin-drying shaft by vertically moving; a clutch motor configured to generate a tensile force in a radial direction of the coupling; a clutch lever configured to decouple the main motor from the coupling by moving the coupling upward using the tensile force of the clutch motor; and a controller configured to rotate the main motor in a mode switching section from a spin-drying mode, in which the coupling is coupled to the main motor, to a washing mode, in which the coupling is decoupled from the main motor, or from the washing mode to the spin-drying mode.

The controller rotates the main motor at a point of time after a predetermined washing switching delay time from a point of time when mode switching from the spin-drying mode to the washing mode is started.

The controller rotates the main motor at a point of time after a predetermined spin-drying switching delay time from a point of time when mode switching from the washing mode to the spin-drying mode is started.

The washing apparatus further comprises: a cam member provided at the clutch motor and configured to rotate together with the clutch motor; and a connection member connected to the cam member and the clutch lever and configured to transmit the tensile force of the clutch motor to the clutch lever, wherein the connection member moves farther from the coupling by rotation of the clutch motor in the mode switching section from the spin-drying mode to the washing mode and moves closer to the coupling by rotation of the clutch motor in the mode switching section from the washing mode to the spin-drying mode.

The coupling is coupled to the main motor in the spin-drying mode to transmit the rotational force of the main motor to the spin-drying shaft.

The washing apparatus further comprises a rotation prevention unit located above the coupling, wherein the coupling is decoupled from the main motor and moves upward by the clutch lever to be coupled to the rotation prevention unit in the washing mode.

The controller rotates the main motor in a direction opposite to a rotation direction immediately before the mode switching section is started.

The controller maintains rotation of the main motor until the mode switching section is ended or for a predetermined time period after the mode switching section is ended.

The washing apparatus further comprises a sensing unit configured to sense a rotation angle of the cam member, wherein the controller determines a point of time to rotate the main motor based on an output signal from the sensing unit.

The controller rotates the main motor at a predetermined time period after the sensing unit outputs an ON signal.

The controller rotates the main motor at a predetermined time period after the sensing unit is turned off.

In accordance with another aspect of the present disclosure, a method of controlling a washing apparatus, the method comprising: generating a rotational force using a main motor; providing the rotational force to a washing shaft; selectively transmitting the rotational force of the main motor to a spin-drying shaft by vertically moving a coupling; generating a tensile force in a radial direction of the coupling using a clutch motor; moving the coupling upward with a clutch lever using the tensile force of the clutch motor; rotating the clutch motor to switch a driving mode of the washing apparatus from a spin-drying mode to a washing mode or from the washing mode to the spin-drying mode; and rotating the main motor in a mode switching section from the spin-drying mode to the washing mode or from the washing mode to the spin-drying mode.

The rotating of the main motor comprises rotating the main motor at a predetermined washing switching delay time after mode switching from the spin-drying mode to the washing mode is started.

The rotating of the main motor comprises rotating the main motor at a predetermined spin-drying switching delay time after mode switching from the washing mode to the spin-drying mode is started.

The method further comprising: rotating a cam member provided at the clutch motor together with the clutch motor;

and transmitting the tensile force of the clutch motor to the clutch lever using a connection member connected to the cam member and the clutch level, wherein the rotating of the clutch motor comprises moving the connection member farther from the coupling by rotating the clutch motor in the mode switching section from the spin-drying mode to the washing mode.

The rotating of the clutch motor comprises moving the connection member closer to the coupling by rotating the clutch motor in the mode switching section from the washing mode to the spin-drying mode.

The rotating of the main motor comprises rotating the main motor in a direction opposite to a rotation direction immediately before the mode switching section is started.

The rotating of the main motor comprises maintaining rotation of the main motor until the mode switching section is ended or for a predetermined time period after the mode switching section is ended.

The rotating of the main motor comprises determining a point of time to rotate the main motor based on an output signal from a sensing unit configured to sense a rotation angle of the cam member.

The rotating of the main motor comprises rotating the main motor at a predetermined time period after the sensing unit outputs an ON signal.

The rotating of the main motor comprises rotating the main motor at a predetermined time period after the sensing unit is turned off.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
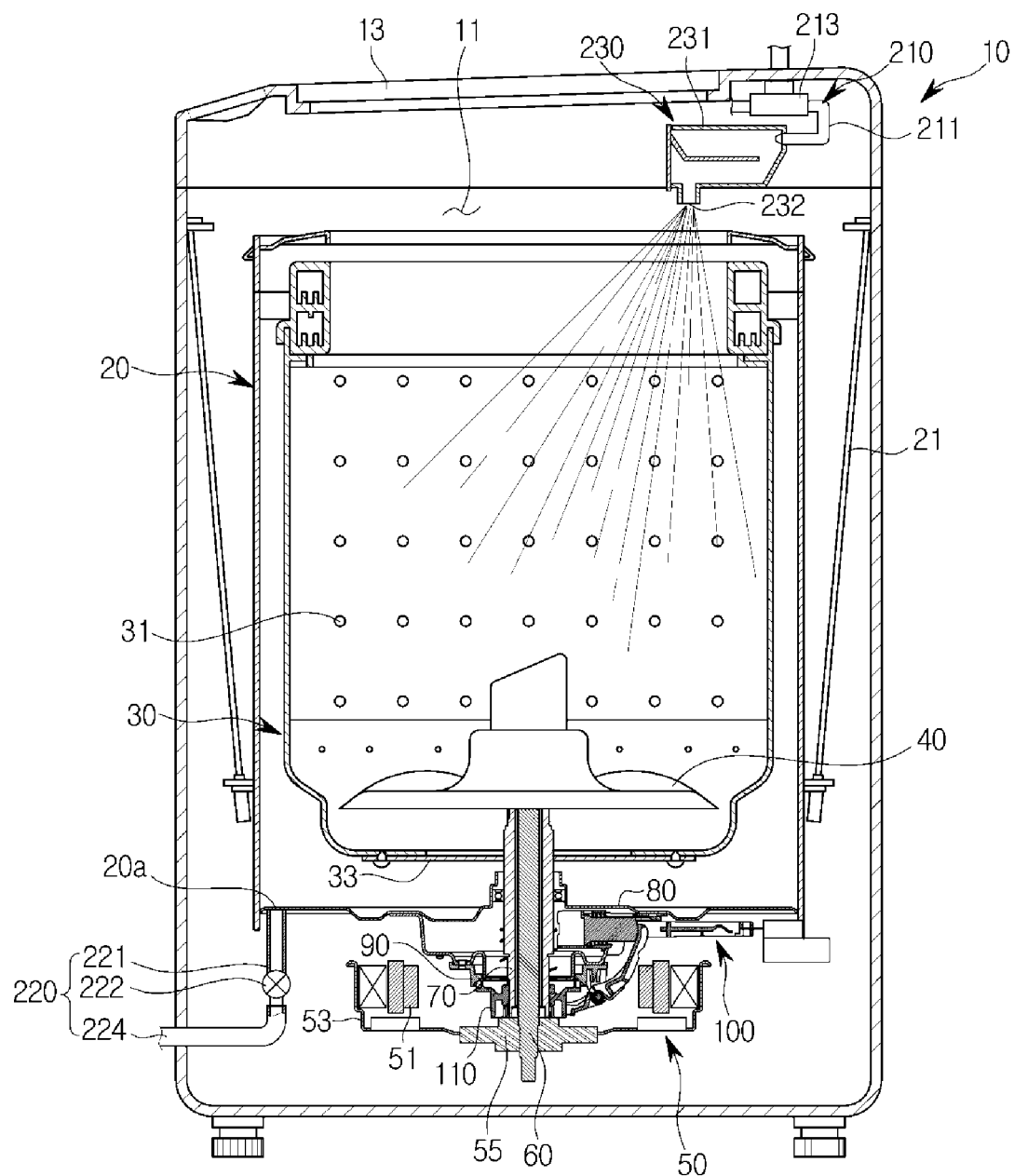
FIG. 1 is a cross-sectional view illustrating a washing apparatus according to an embodiment of the present disclosure.

Reference will now be made in detail to the embodiments of the present disclosure, examples of which are illustrated in the accompanying drawings, wherein like reference numerals refer to like elements throughout.

FIG. 1 is a cross-sectional view illustrating a washing apparatus according to an embodiment of the present disclosure.

Referring to FIG. 1, a washing apparatus 1 according to an embodiment includes a cabinet 10 defining an external appearance, a tub 20 installed in the cabinet 10 and configured to retain water, a rotary tub 30 rotatably mounted in the tub 20 and configured to accommodate clothes, a pulsator 40 rotatably installed at the bottom of the rotary tub 30 and configured to generate a water stream, a main motor 50 located under the rotary tub 30 and configured to rotate the rotary tub 30 and the pulsator 40, and a clutch assembly 100 located under the rotary tub 30 and configured to selectively transfer rotational force generated by the main motor 50 to the rotary tub 30.

The cabinet 10 may have a laundry inlet 11 through which clothes are loaded into the rotary tub 30 at an upper portion thereof and a door 13 configured to open and close the laundry inlet 11.

The tub 20 may be formed in a cylindrical shape with an open top and contain wash water. In addition, the tub 20 may be supported by a suspension device 21 in a state of being hung on the cabinet 10. The suspension device 21 is disposed between an inner surface of the cabinet 10 and an outer surface of the tub 20 and configured to reduce vibrations generated in the cabinet 10 or the tub 20 during a wash cycle or a spin-drying cycle.

A housing 80 is provided under the tub 20 such that a washing shaft 60 and a spin-drying shaft 70 rotatably penetrate the housing 80, and a rotation prevention unit 90 configured to prevent rotation of a coupling 110 is fixed to the bottom of the housing 80.

The rotary tub 30 may have an open top through which clothes are loaded and be rotatably installed in the tub 20. A plurality of holes 31 through which wash water flows into and out of the rotary tub 30 may be formed at the side walls of the rotary tub 30. A flange shaft 33 may be coupled to the bottom of the rotary tub 30 in a state of being connected to the main motor 50 and transmit rotational force of the main motor 50 to the rotary tub 30.

The pulsator 40 is rotatably installed at the inner bottom of the rotary tub 30 and agitates clothes loaded into the rotary tub 30 together with wash water. The pulsator 40 is connected to the main motor 50 through the washing shaft 60. When rotational force generated by the main motor 50 is transmitted to the washing shaft 60 and the washing shaft 60 rotates by the rotational force, the pulsator 40 may rotate clockwise or counterclockwise. When a water stream is generated by rotation of the pulsator 40, clothes and water contained in the rotary tub 30 are agitated and the clothes may be washed by frictional force between the clothes and water.

The rotary tub 30 is connected to the main motor 50 through the spin-drying shaft 70, and rotational force generated by the main motor 50 is transmitted to the spin-drying shaft 70. When the spin-drying shaft 70 rotates, the rotary tub 30 rotates clockwise or counterclockwise together with the spin-drying shaft 70.

For example, the main motor 50 may be a direct drive (DD) motor that is directly connected to the washing shaft 60 and transmits power thereto. Also, the main motor 50 may be a brushless DC (BLDC) motor that controls rotation speed. In this case, the main motor 50 may include a stator 51 and a rotor 53 that rotates by electromagnetic interaction with the stator 51.

A water supply unit 210 is installed at an upper portion of the tub 20 and supplies water into the tub 20 from an external water source. The water supply unit 210 includes a water supply pipe 211 configured to guide ware from the external water source to the tub 20 and a water supply valve 213 provided at the water supply pipe 211 to open and close the water supply pipe 211.

One end of the water supply pipe 211 is connected to a detergent feed unit 230, and water supplied from the water supply pipe 211 may flow into the tub 20 through the detergent feed unit 230.

The detergent feed unit 230 may include a detergent case 231 accommodating a detergent, and the detergent case 231 may be connected to the one end of the water supply pipe 211. Water supplied through the water supply unit 210 is mixed with the detergent while flowing in the detergent case 231, and water mixed with the detergent flows into the tub 20 through a discharge port 232 disposed at the bottom of the detergent case 231.

A drainage unit 220 may be disposed at a lower portion of the tub 20 to drain water contained in the tub 20 out of the cabinet 10. The drainage unit 220 may include a first drain pipe 221 to guide water contained in the tub 20 out of the tub 20, a drain valve 222 to open and close the first drain pipe 221, and a second drain pipe 224 to guide water from the drain valve 222 out of the cabinet 10.

One end of the first drain pipe 221 may be connected to a drain hole 20a formed at the bottom surface of the tub 20, and the other end may be connected to the drain valve 222.

The drain valve 222 may be disposed at one end of the first drain pipe 221 to open and close the first drain pipe 221. When the drain valve 222 is open, water contained in the tub 20 may be drained to the outside through the first drain pipe 221 and the second drain pipe 224.

For example, the drain valve 222 may receive power for opening and closing the drain valve 222 from a drain motor (not shown). Particularly, when the drain motor is driven, the drain valve 222 is opened and water of the tub 20 is drained. When the drain motor is not driven, the drain valve 222 is closed.

One end of the second drain pipe 224 may be connected to the drain valve 222, and the other end may extend to the outside of the cabinet 10 and guide water from the first drain pipe 221 out of the cabinet 10.

The water supply unit 210, the drainage unit 220, and the detergent feed unit 230 are exemplarily described as components of the washing apparatus 1, and embodiments of the washing apparatus 1 are not limited thereto.

Figure 2:
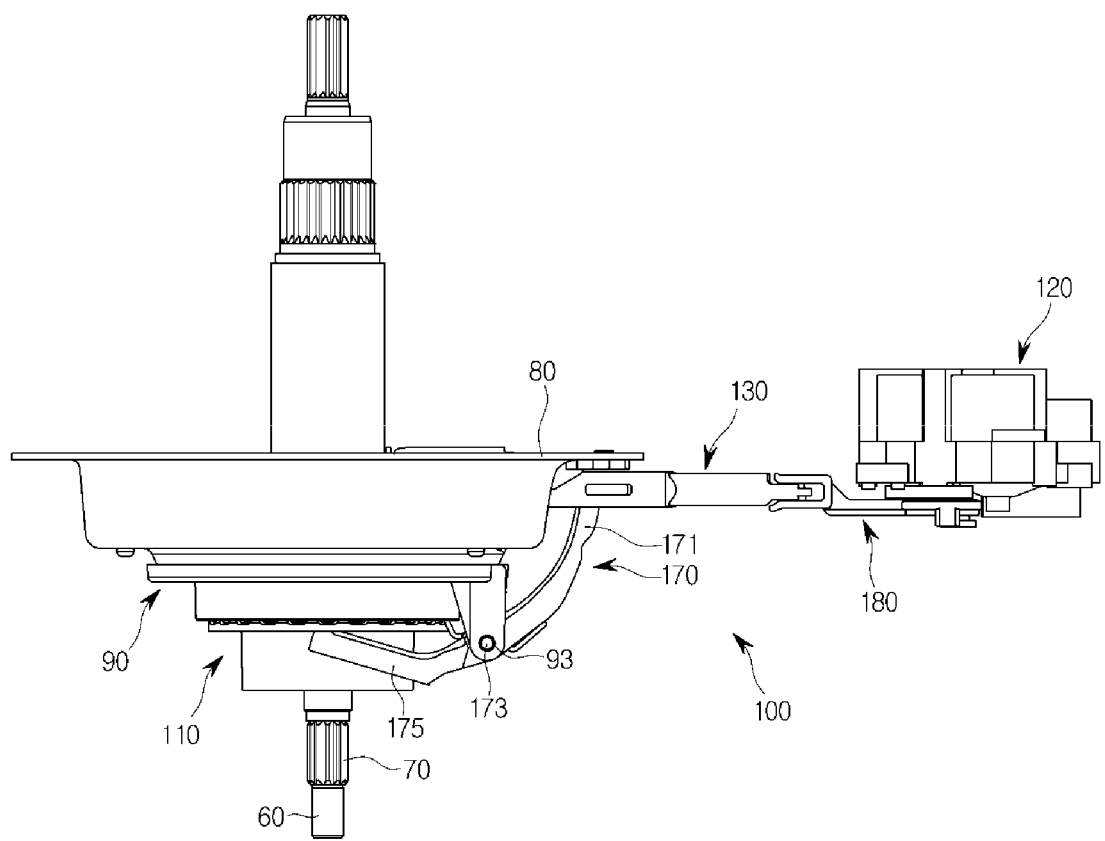
FIG. 2 is a side view illustrating a clutch assembly of a washing apparatus according to an embodiment and a related structure thereof.
Figure 3:
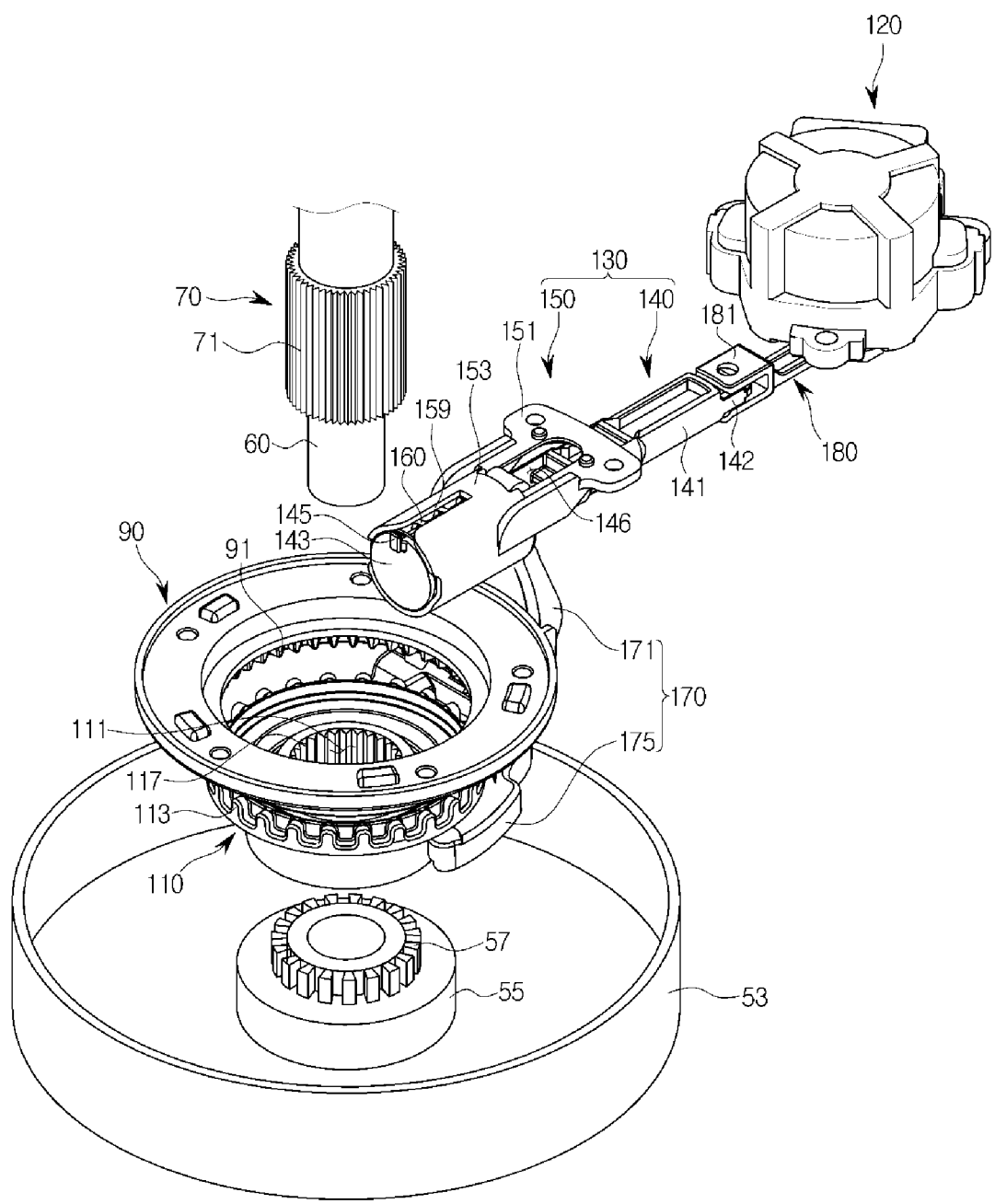
FIG. 3 is an exploded perspective view illustrating a clutch assembly of a washing apparatus according to an embodiment and a related structure thereof.
Figure 4:
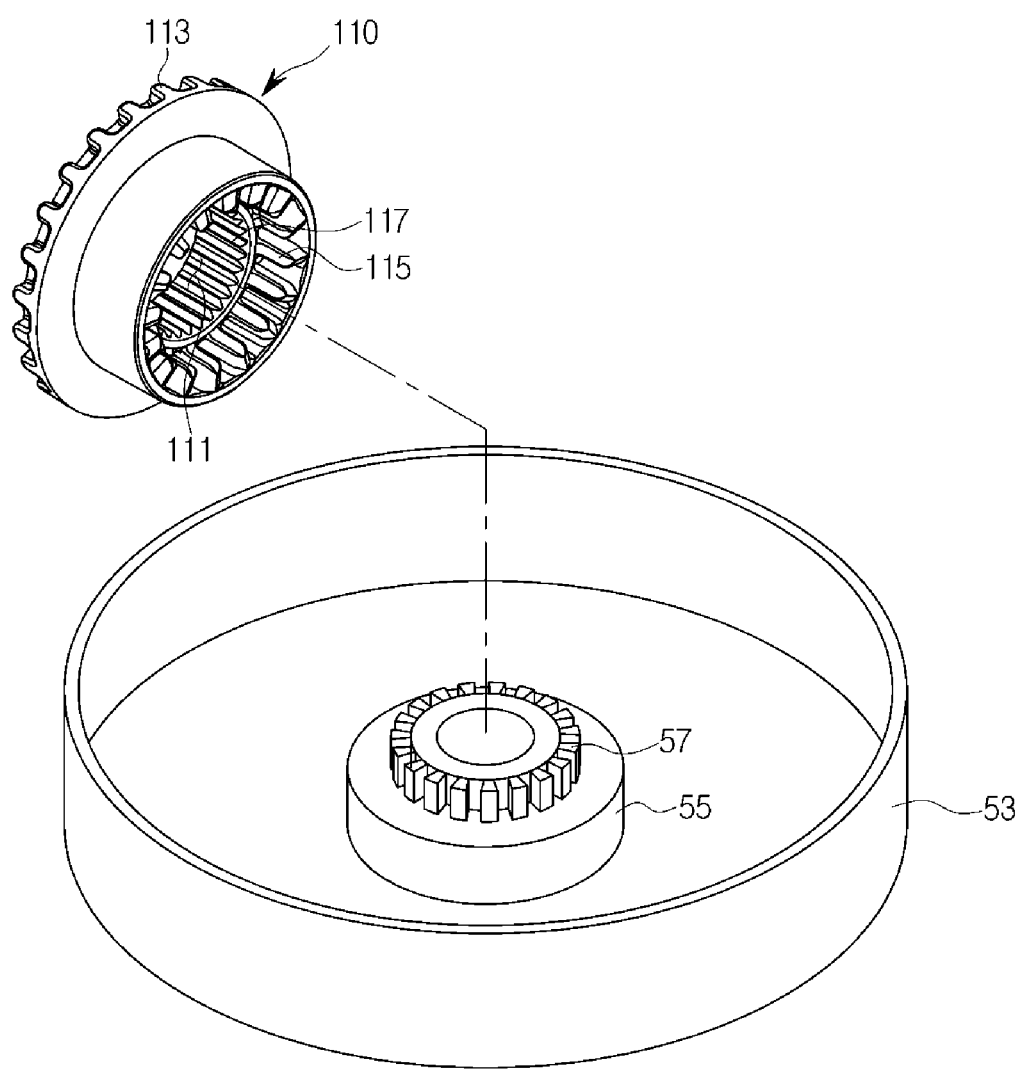
FIG. 4 is a view illustrating a coupling connected to a rotor in a washing apparatus according to an embodiment.

FIG. 2 is a side view illustrating a clutch assembly of a washing apparatus according to an embodiment and a related structure thereof. FIG. 3 is an exploded perspective view illustrating a clutch assembly of a washing apparatus according to an embodiment and a related structure thereof. FIG. 4 is a view illustrating a coupling connected to a rotor in a washing apparatus according to an embodiment.

As described above, the clutch assembly 100 may selectively transmit rotational force generated by the main motor 50 to the spin-drying shaft 70. As illustrated in FIGS. 2 to 4, the clutch assembly 100 may include a coupling 110 moving in a vertical direction to be selectively coupled to the spin-drying shaft 70, a clutch motor 120 configured to generate tensile force in a radial direction of the coupling 110, a link unit 130 connected to the clutch motor 120 and tensioned in the radial direction of the coupling 110 when power is supplied to the clutch motor 120, a clutch lever 170 connected to the link unit 130 and lifting the coupling 110 upward by using tensile force generated by the clutch motor 120, and a connection member 180 connecting the link unit 130 with the clutch motor 120.

The coupling 110 may vertically move between the rotation prevention unit 90 and the main motor 50 to be selectively coupled to the main motor 50 and selectively rotate the spin-drying shaft 70 as it is selectively coupled to the main motor 50. Particularly, when the coupling 110 moves upward, it is decoupled from the main motor 50 and coupled to the rotation prevention unit 90 to fix the spin-drying shaft 70, and thus rotation thereof is prevented. On the contrary, when the coupling 110 moves downward, it is coupled to the main motor 50 and transmit rotational force received from the main motor 50 to the spin-drying shaft 70, thereby rotating the spin-drying shaft 70.

A hub 55, which is axially coupled to the washing shaft 60, transmits rotational force of the rotor 53 to the washing shaft 60, and rotates the washing shaft 60, may be disposed at a rotation center of the rotor 53, and a power transmission toothed unit 57, which is engaged with the coupling 110 and transmits the rotational force of the rotor 53 to the coupling 110, may be provided at the hub 55.

The coupling 110 has a through-hole 111 through which the washing shaft 60 and the spin-drying shaft 70 pass and includes a first toothed part 113 and a second toothed part 115, respectively disposed at upper and lower portions of the coupling 110 and a first serration part 117 provided on the inner circumferential surface of the through-hole 111.

The through-hole 111 is provided such that the washing shaft 60 and the spin-drying shaft 70 pass therethrough, and the spin-drying shaft 70 may have a hollow inside such that the washing shaft 60 passes therethrough. The washing shaft 60 may be rotatably installed within the spin-drying shaft 70 to be connected to the pulsator 40. A second serration part 71 engaged with the first serration part 117, which is provided on the inner circumferential surface, is provided on the outer circumferential surface of the spin-drying shaft 70. The first serration part 117 and the second serration part 71 are engaged with each other so that the coupling 110 is connected to the spin-drying shaft 70.

Since the washing shaft 60 is axially coupled to the hub 55 disposed at the rotor 53, the washing shaft 60 rotates whenever the rotor 53 rotates. However, since the second serration part 71 of the spin-drying shaft 70 is engaged with the first serration part 117 of the coupling 110, the spin-drying shaft 70 may rotate together with the coupling 110 only when the coupling 110 rotates, thereby rotating the rotary tub 30.

As the coupling 110 moves downward, the coupling 110 is brought into close contact with the hub 55 of the rotor 53 such that the second toothed part 115 provided at the coupling 110 is engaged with the power transmission toothed unit 57 provided at the hub 55.

When the second toothed part 115 is engaged with the power transmission toothed unit 57, the rotational force is transmitted to the coupling 110 while the rotor 53 rotates, and thus the coupling 110 rotates. As the coupling 110 rotates, the spin-drying shaft 70 rotates to rotate the rotary tub 30. As described above, the pulsator 40 connected to the washing shaft 60 always rotates upon rotation of the rotor 53. Thus, as the rotor 53 rotates in a state where the second toothed part 115 is engaged with the power transmission toothed unit 57, the rotary tub 30 and the pulsator 40 simultaneously rotate, and thus the washing apparatus 1 operates in a spin-drying mode.

As the coupling 110 moves upward, the coupling 110 is decoupled from the hub 55 so that the rotational force of the rotor 53 is not transmitted to the coupling 110. In addition, the coupling 110 is in close contact with the rotation prevention unit 90 such that the first toothed part 113 provided at the coupling 110 is engaged with a rotation prevention toothed unit 91 provided at the rotation prevention unit 90.

When the coupling 110 is decoupled from the hub 55 and the first toothed part 113 is engaged with the rotation prevention toothed unit 91, rotation of the coupling 110 is prevented to stop rotation of the spin-drying shaft 70. Thus, the rotary tub 30 connected to the spin-drying shaft 70 does not rotate while the pulsator 40 rotates. As a result, the washing apparatus 1 operates in a washing mode.

The clutch motor 120 generates tensile force in a radial direction of the coupling 110, and the link unit 130 is connected to the clutch motor 120 via the connection member 180. Thus, tensile force generated by the clutch motor 120 is transmitted to the clutch lever 170. Hereinafter, a structure of the link unit 130 will be described with reference to FIGS. 5 and 6.

Figure 5:
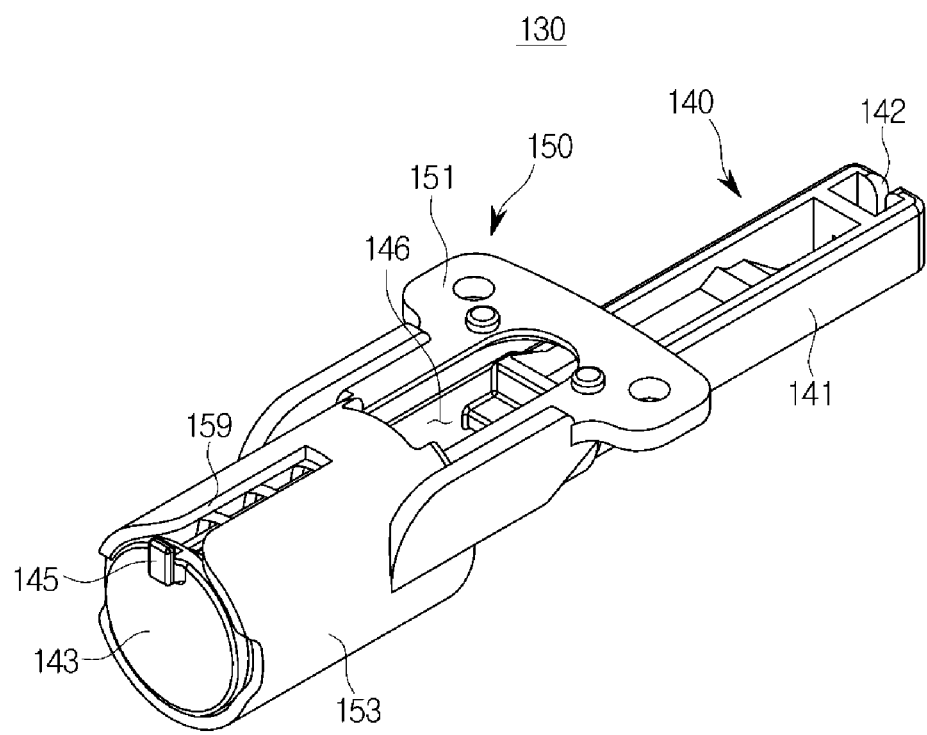
FIG. 5 is a perspective view illustrating a structure of a link unit of a washing apparatus according to an embodiment.
Figure 6:
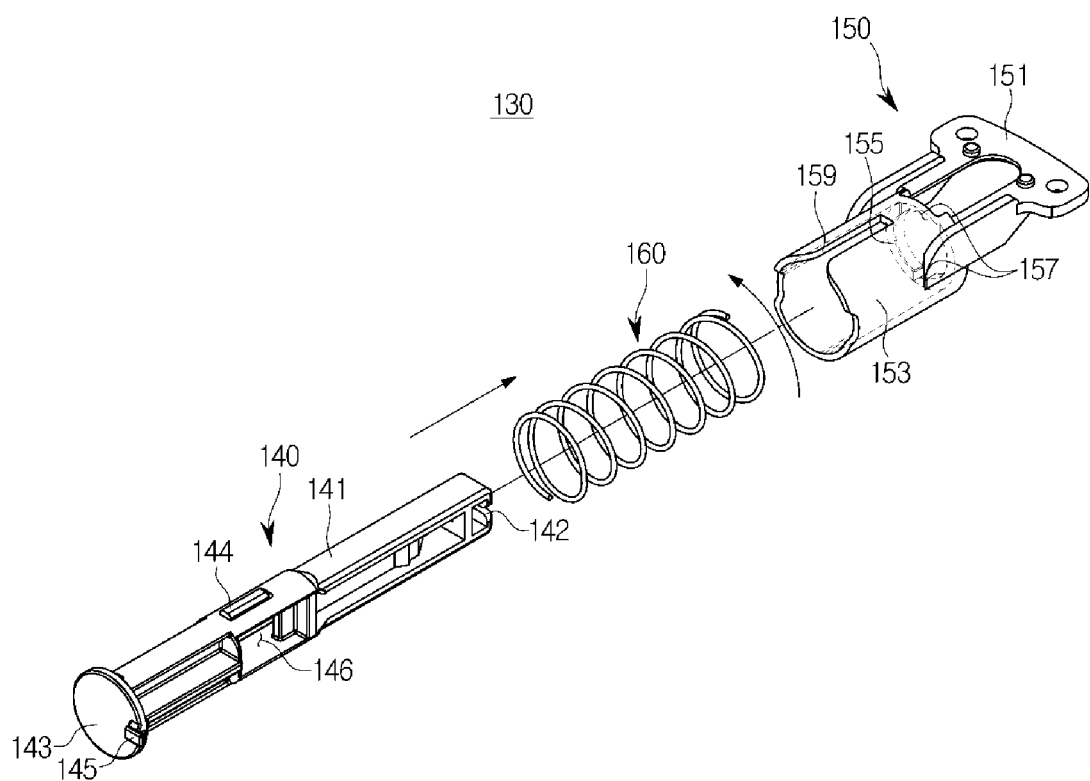
FIG. 6 is an exploded view illustrating a structure of a link unit of a washing apparatus according to an embodiment.

FIG. 5 is a perspective view illustrating a structure of a link unit of a washing apparatus according to an embodiment. FIG. 6 is an exploded view illustrating a structure of a link unit of a washing apparatus according to an embodiment.

Referring to FIGS. 5 and 6, the link unit 130 may include a link 140 connected to the clutch motor 120 via the connection member 180, a guide 150 guiding linear movement of the link 140, and a first return spring 160 enabling the link 140 to be elastically supported by the guide 150.

The link 140 includes a body part 141 guided by the guide 150 to linearly move, a connection part 142 disposed at one end of the body part 141 to be connected to the connection member 180, and a first support part 143 disposed at the other end of the body part 141 to support one end of the first return spring 160.

The body part 141 may have a dislocation prevention protrusion 144 to prevent the link 140 from being dislocated from the guide 150 after the link 140 is inserted into the guide 150 to linearly move and an insertion hole 146 into which one end of the clutch lever 170 is inserted such that the clutch lever 170 rotates as the link 140 linearly moves.

The first support part 143 supports one end of the first return spring 160 to compress the first return spring 160 when the link 140 linearly moves in the radial direction of the coupling 110. The first support part 143 has a rotation prevention protrusion 145 to prevent rotation thereof when the link 140 linearly moves.

The guide 150 includes a coupling part 151 fixedly coupled to the housing 80 and a guide part 153 having a hollow cylindrical shape to guide linear movement of the link 140.

The guide part 153 has an opening having a diameter greater than that of the first support part 143 of the link 140 at one end thereof such that the link 140 is inserted into the opening and linearly moves and includes a second support part 155 to support the other end of the first return spring 160 at the other end thereof.

The second support part 155 has an opening having a diameter smaller than that of the first support part 143 to prevent the first support part 143 of the inserted link 140 from passing therethrough. Thus, the second support part 155 supports the other end of the first return spring 160 and limits a lineal movement range of the link 140.

The second support part 155 may have a plurality of insertion grooves 157, the number of which corresponds to that of the dislocation prevention protrusions 144, such that the dislocation prevention protrusions 144 of the link 140 pass therethrough while being inserted into the guide part 153.

Thus, if the link 140 is inserted into the guide part 153 such that the dislocation prevention protrusion 144 of the link 140 passes through the insertion groove 157, and then the link 140 is rotated by a predetermined angle, the dislocation prevention protrusion 144 of the link 140 is held by the second support part 155. As a result, the link 140 is not dislocated in a direction opposite to the insertion direction.

The guide part 153 includes a rotation prevention guide part 159 to prevent rotation of the link 140 while linearly moving. The rotation prevention guide part 159 has a long groove shape formed from the open end of the guide part 153 in the linear movement direction of the link 140.

Thus, when the link 140 is inserted into the guide part 153 such that the dislocation prevention protrusion 144 of the link 140 passes through the insertion groove 157, and the link 140 is rotated such that a position of the rotation prevention protrusion 145 corresponds to a position of the rotation prevention guide part 159, the dislocation prevention protrusion 144 of the link 140 is held by the second support part 155. As a result, the link 140 is not dislocated in a direction opposite to the insertion direction. In addition, since the rotation prevention protrusion 145 is inserted into the rotation prevention guide part 159 and linearly moves along the rotation prevention guide part 159, rotation of the link 140 may be prevented while the link 140 linearly moves.

Figure 7:
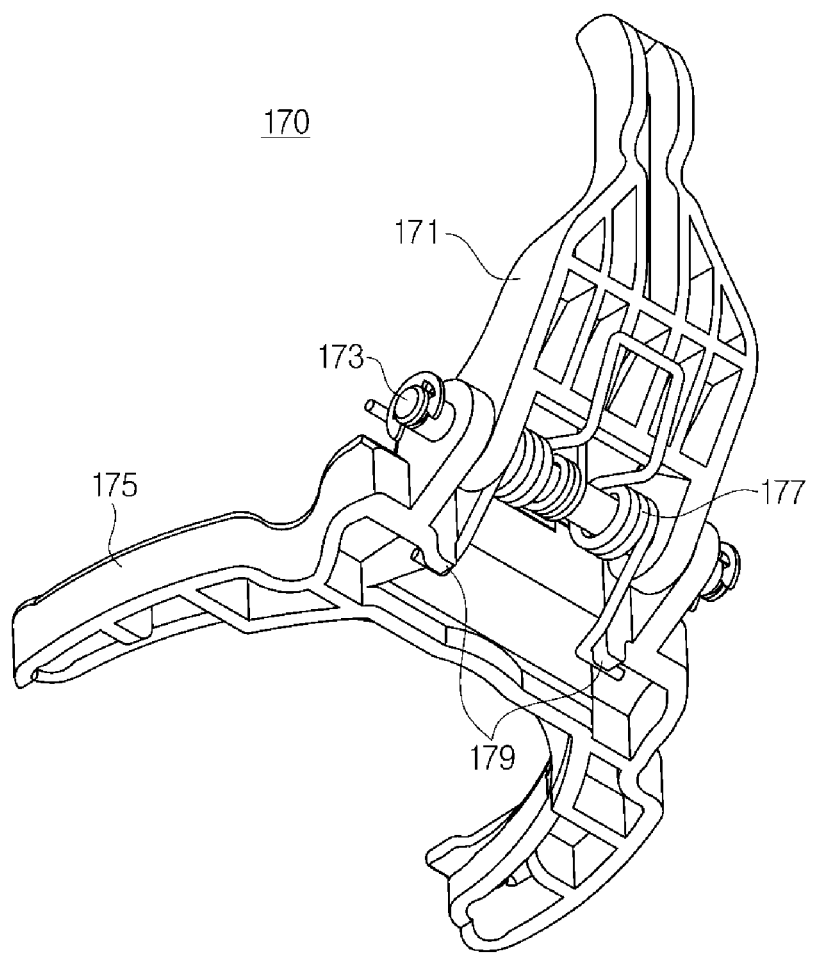
FIG. 7 is a perspective view illustrating a clutch lever of a washing apparatus according to an embodiment.
Figure 8:
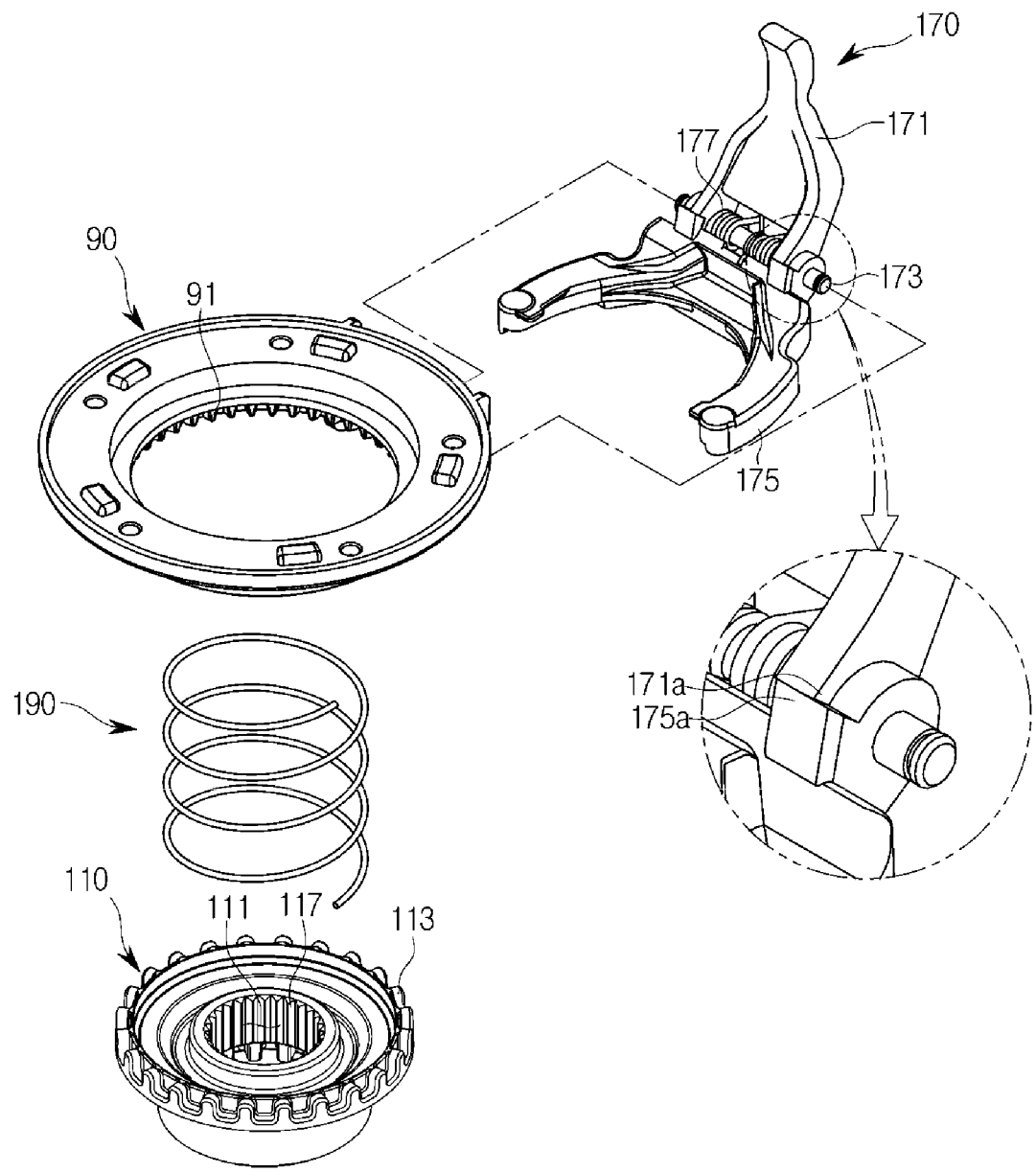
FIGS. 8 and 9 are views illustrating a clutch lever of a washing apparatus is coupled to a rotation prevention unit.
Figure 9:
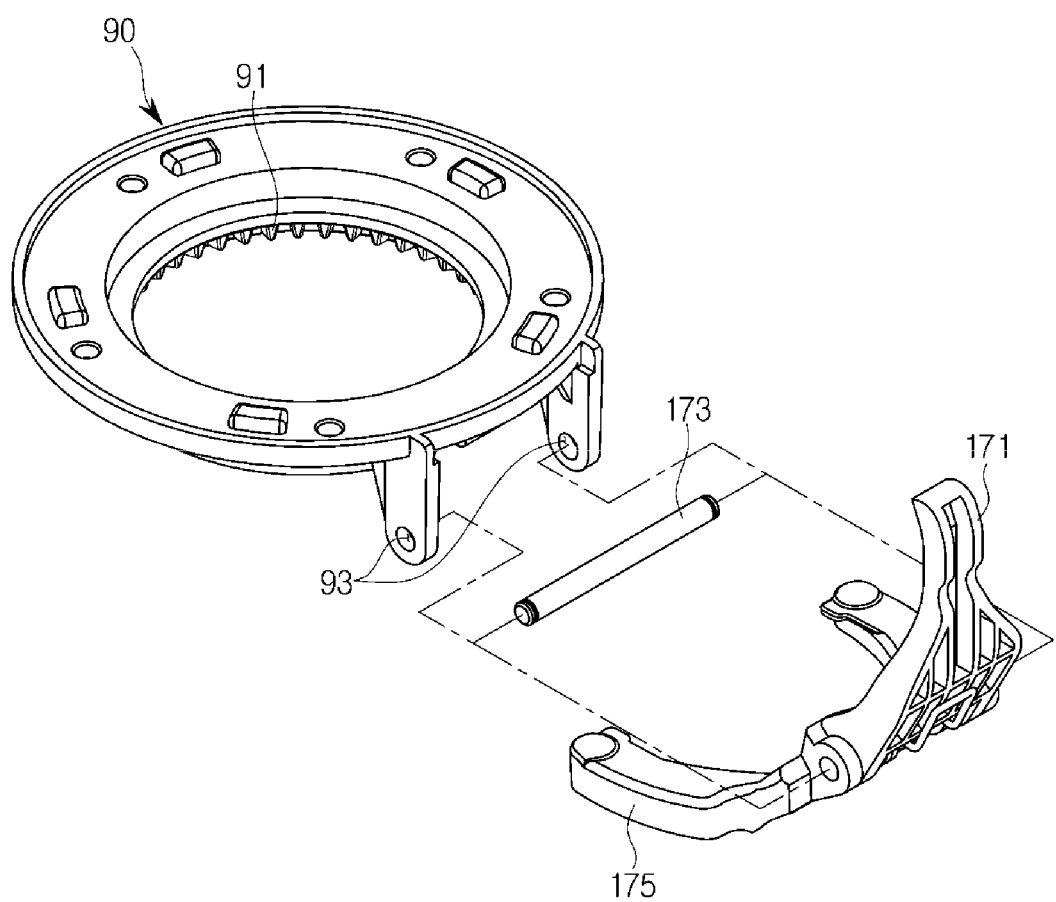

The first return spring 160 is elastically supported by the first support part 143 of the link 140 at one end and elastically supported by the second support part 155 of the guide 150 at the other end in a state of being accommodated in the guide part 153 of the guide 150. Thus, the first return spring 160 is compressed when the link 140 linearly moves in the radial direction of the coupling 110 by tensile force generated by the clutch motor 120 and returns by elasticity in the opposite direction of the tensile force applied to the link 140 when the tensile force generated by the clutch motor 120 is removed FIG. 7 is a perspective view illustrating a clutch lever of a washing apparatus according to an embodiment. FIGS. 8 and 9 are views illustrating a clutch lever of a washing apparatus is coupled to a rotation prevention unit.

As described above, one end of the clutch lever 170 is inserted into the insertion hole 146 of the link 140. As illustrated in FIGS. 7 to 9, the clutch lever 170 includes a first clutch lever 171 connected to the link 140, a rotation shaft 173 disposed at the other end of the first clutch lever 171 such that the first clutch lever 171 is rotatably coupled to rotation holes 93 provided at the rotation prevention unit 90, a second clutch lever 175 having one end rotatably connected to the rotation shaft 173 and the other end supporting the coupling 110, and a torsion spring 177 disposed at the rotation shaft 173 and rotating at directions to bend the first clutch lever 171 and the second clutch lever 175, respectively.

The first clutch lever 171 and the second clutch lever 175 are respectively provided with a first stopper 171a and a second stopper 175a which limit rotation ranges of the first clutch lever 171 and the second clutch lever 175 bent by the torsion spring 177.

When the link 140 linearly moves in the radial direction of the coupling 110, the first clutch lever 171 rotates about the rotation shaft 173 clockwise. In this regard, the clockwise and the counterclockwise directions are determined based on FIGS. 7 to 9, and these directions may be changed. In addition, rotation of the clutch lever 170 is distinguished from rotations of the clutch motor 120 and the main motor 50. For example, the rotation of the main motor 50 may be a rotation performed on an x-y plane in a three-dimensional space defined by x-, y-, and z-axes, and the rotation of the clutch lever 170 may be a rotation performed on a y-z plane.

When the first clutch lever 171 rotates clockwise about the rotation shaft 173, the second clutch lever 175 receives force from the torsion spring 177. Thus, the second clutch lever 175 rotates clockwise about the rotation shaft 173 in the same manner as the first clutch lever 171.

When power is supplied to the clutch motor 120 and tensile force is generated, the second clutch lever 175 rotates clockwise about rotation shaft 173. Therefore, the coupling 110 supported by the second clutch lever 175 moves upward.

Since tensile force generated by the clutch motor 120 is directly transmitted to the link 140 and linearly moves the link 140, the clutch lever 170 may be rotated without losing force. In addition, since the clutch lever 170 moves the coupling 110 upward by rotational force thereof, tensile force generated by the clutch motor 120 is converted into rotational force of the clutch lever 170 with minimized loss of the tensile force and moves the coupling 110 upward.

Meanwhile, in the state where the coupling 110 moves upward to be in close contact with the rotation prevention unit 90, in order to prevent the coupling 110 from being dislocated from the close contact position with the rotation prevention unit 90 by vibration during a wash operation, the first clutch lever 171 may further rotate by a predetermined angle even when the first toothed part 113 of the coupling 110 is engaged with the rotation prevention toothed unit 91 of the rotation prevention unit 90. Thus, the second clutch lever 175 rotated by the torsion spring 177 continues to push the coupling 110 upward. Here, the predetermined angle for further rotating the first clutch lever 171 may be preset in consideration of positional relations between the components and designs thereof.

Figure 10:
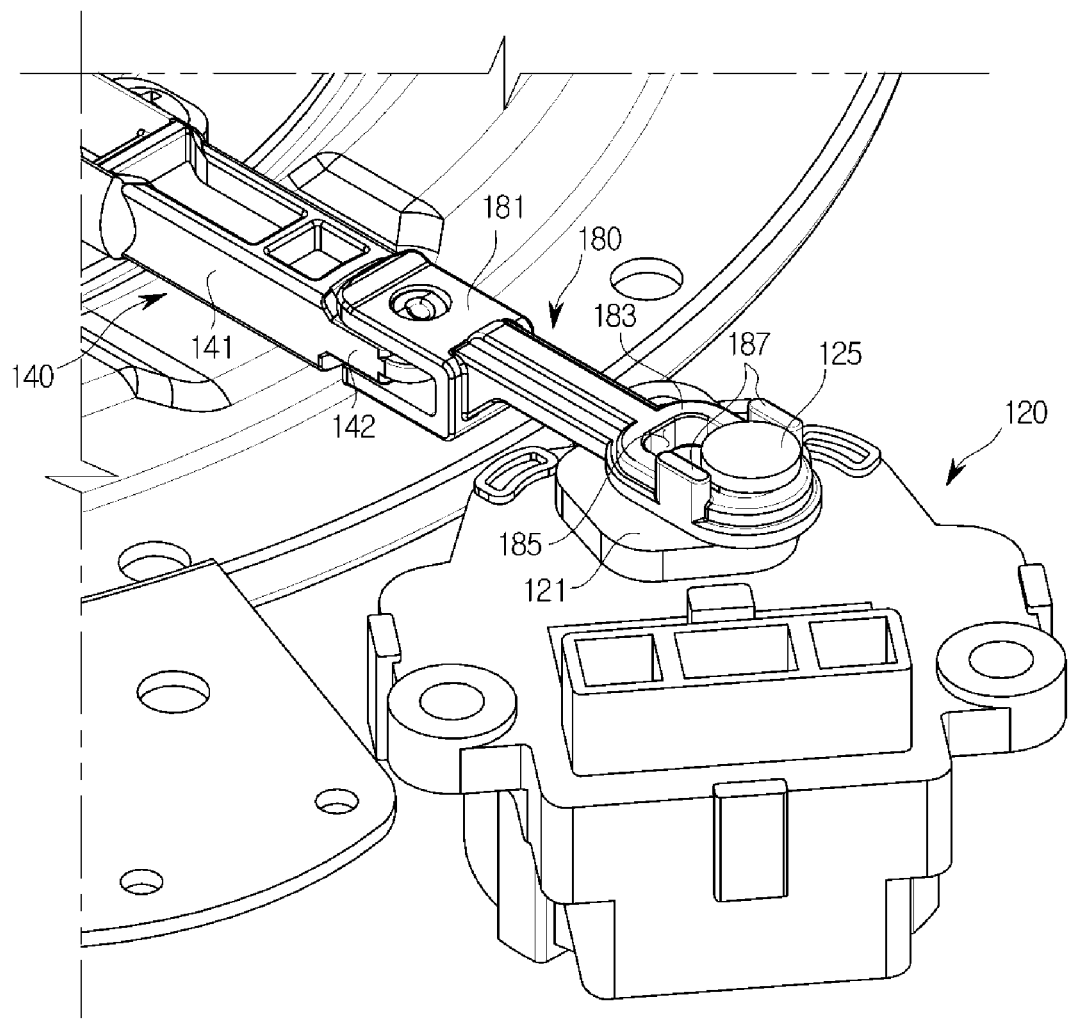
FIG. 10 is a view illustrating a structure in which a clutch motor is connected to a link unit via a connection member according to an embodiment.

FIG. 10 is a view illustrating a structure in which a clutch motor is connected to a link unit via a connection member according to an embodiment.

Referring to FIG. 10, the clutch motor 120 includes a cam member 121 rotating in the radial direction of the coupling 110 to generate tensile force and a rotation protrusion 125 protruding from the cam member 121 and rotating together with the cam member 121.

When power is supplied to the clutch motor 120, the cam member 121 rotates about a central axis 123 (FIG. 11A) disposed at the center thereof. As the cam member 121 rotates, the rotation protrusion 125 provided at the cam member 121 simultaneously rotates.

A connection part 181 rotatably connected to the connection part 142 of the link 140 is provided at one end of the connection member 180, and a holding ring 183 having a holding hole 185 by which the rotation protrusion 125 of the clutch motor 120 is held is provided at the other end of the connection member 180.

When the rotation protrusion 125 is inserted into the holding hole 185, the rotation protrusion 125 is held by the holding ring 183, and the link 140 connected to the connection member 180 linearly moves in the radial direction of the coupling 110 by the rotation protrusion 125, which rotates upon rotation of the cam member 121.

Since the connection member 180 is rotatably connected to the link 140, the connection member 180 rotates about the connection part 181 and the link 140 linearly moves in the radial direction of the coupling 110 when the rotation protrusion 125 rotates.

Dislocation prevention ribs 187 are provided to prevent the holding ring 183 from being dislocated from the rotation protrusion 125 even when the holding ring 183 is tilted by vibration of the washing apparatus. Since the dislocation prevention ribs 187 are located at both sides of the holding ring 183, the rotation protrusion 125 contacts the dislocation prevention ribs 187 before contacting the holding hole 185 when the holding ring 183 is tilted. However, the dislocation prevention ribs 187 are exemplarily illustrated in FIG. 10. Alternatively, an integrated form of the dislocation prevention ribs 187 may also be used.

Figure 11A:
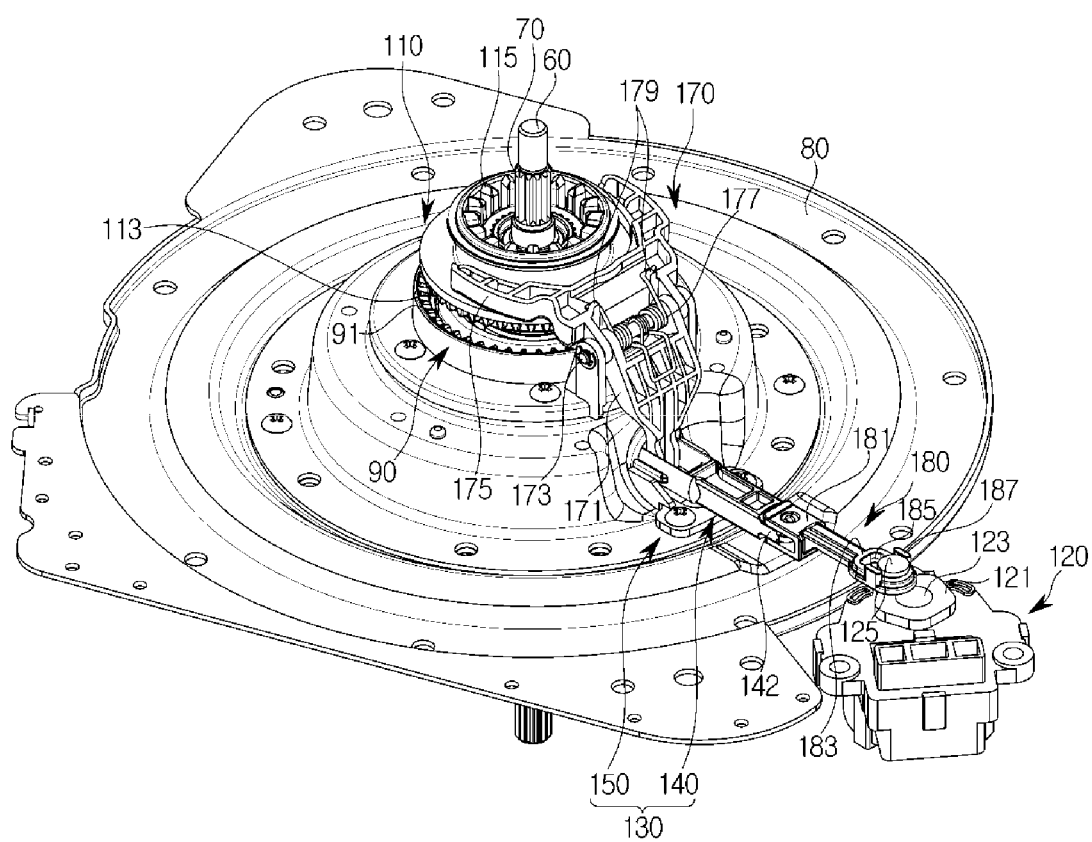
FIGS. 11A and 11B are a perspective view and a plan view illustrating positions of a cam member when a washing apparatus according to an embodiment operates in a spin-drying mode.
Figure 11B:
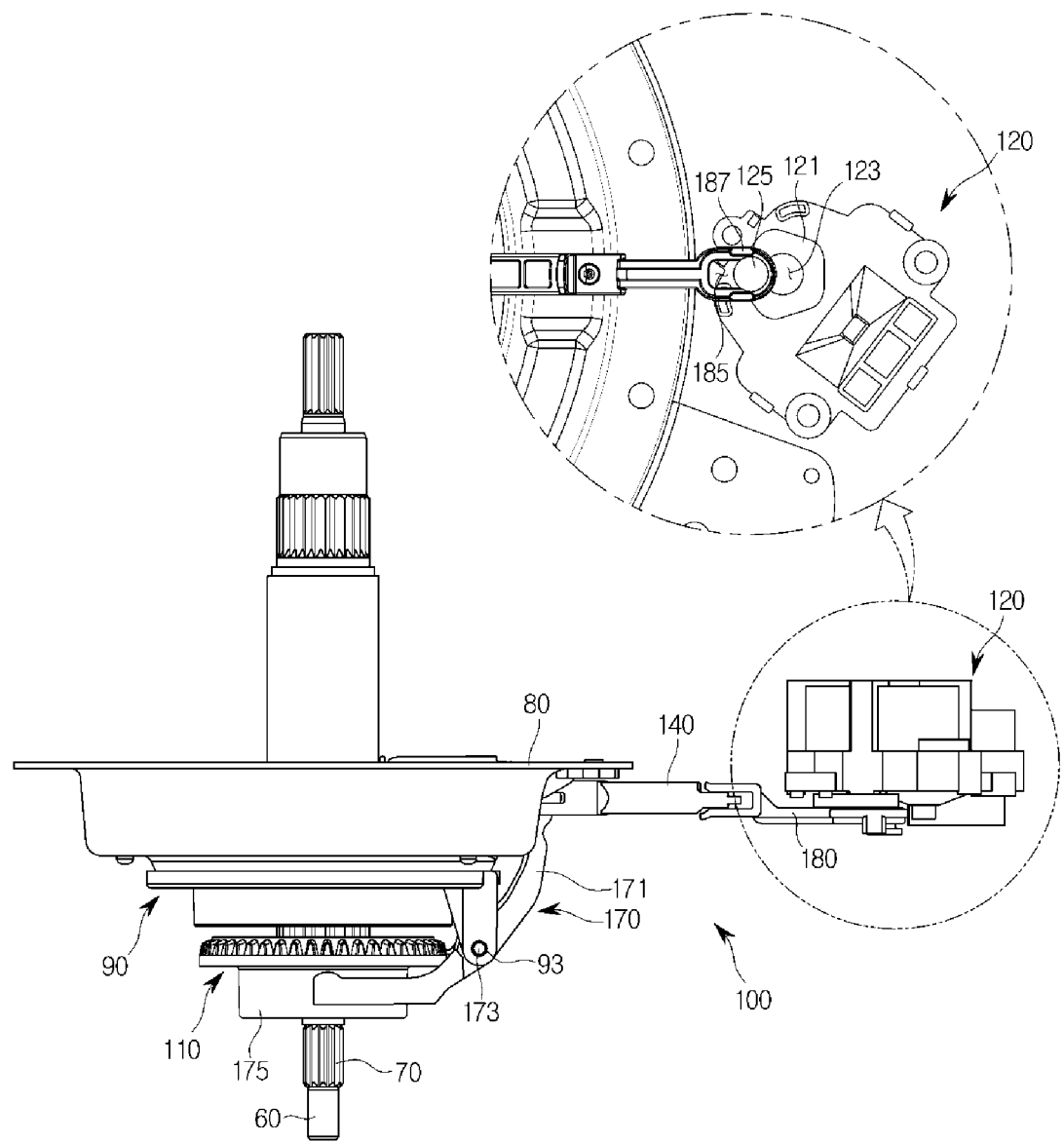
Figure 12:
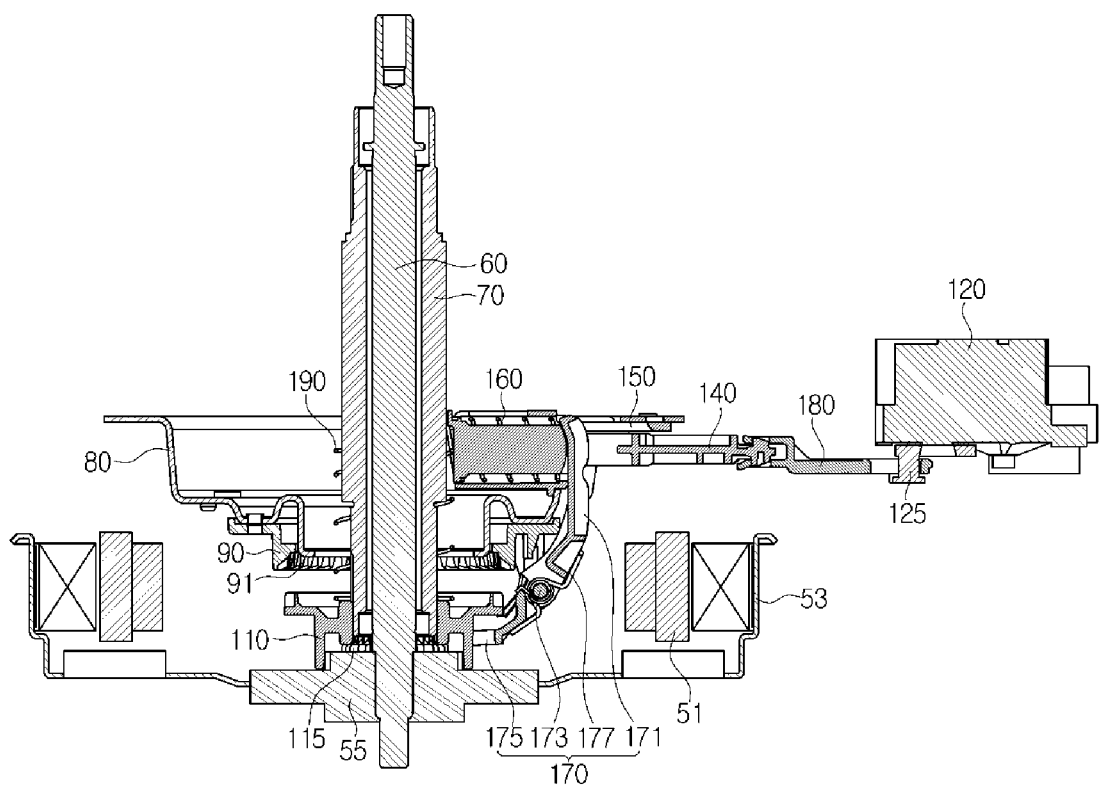
FIG. 12 is a side view illustrating a position of a clutch assembly when a washing apparatus according to an embodiment operates in a spin-drying mode.

FIGS. 11A and 11B are a perspective view and a plan view illustrating positions of a cam member when a washing apparatus according to an embodiment operates in a spin-drying mode. FIG. 12 is a side view illustrating a position of a clutch assembly when a washing apparatus according to an embodiment operates in a spin-drying mode.

In the initial stage when power is not supplied to the clutch motor 120, the cam member 121 is not tensioned in the radial direction of the coupling 110, as illustrated in FIGS. 11A and 11B. When the rotation protrusion 125 is located at the closest position to the coupling 110, the connection member 180 connected to the rotation protrusion 125 is also located at the closest position to the coupling 110. In this case, since tensile force is not applied in the radial direction, the clutch lever 170 connected to the connection member 180 does not lift the coupling 110 upward.

In this case, as illustrated in FIG. 12, tensile force is not applied to the link 140 in the radial direction of the coupling 110, and upward force is not applied to the coupling 110 by the second clutch lever 175. Thus, the coupling 110 is in a close contact with the hub 55.

When the coupling 110 is in close contact with the hub 55, the second toothed part 115 of the coupling 110 is engaged with the power transmission toothed unit 57 of the hub 55. Thus, the rotational force of the rotor 53 is transmitted to the coupling 110 to rotate the coupling 110, and the coupling 110 rotates the spin-drying shaft 70.

The washing shaft 60 is axially coupled to the hub 55 of the rotor 53 and always rotates together with the rotor 53. Thus, when the rotation angle of the cam member 121 is a spin-drying mode angle, the spin-drying mode, in which the washing shaft 60 and the spin-drying shaft 70 simultaneously rotate, is performed.

The rotation angle of the cam member 121 may be defined by the position of the rotation protrusion 125. The rotation angle of the cam member 121 may refer to an angle rotated from a predetermined reference angle. As described above, when the rotation protrusion 125 is located at the closest position to the coupling 110, the coupling 110 is coupled to the hub 55 of the main motor 50 to perform the spin-drying mode. Thus, the rotation angle of the cam member 121 at this position may be defined as a spin-drying mode angle, and the position of the coupling 110 may be defined as a spin-drying mode position.

Figure 13:
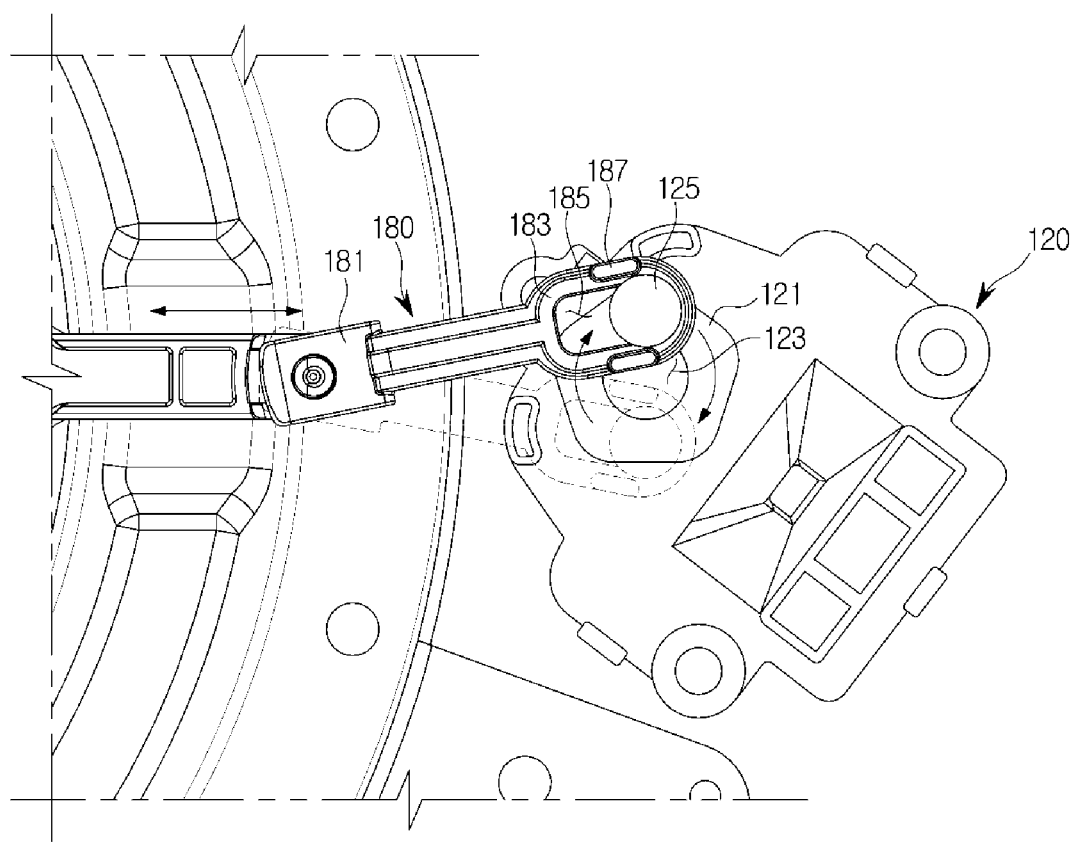
FIG. 13 is a view illustrating a structure in which the cam member rotates by supplying power to the clutch motor of the washing apparatus according to an embodiment.
Figure 14A:
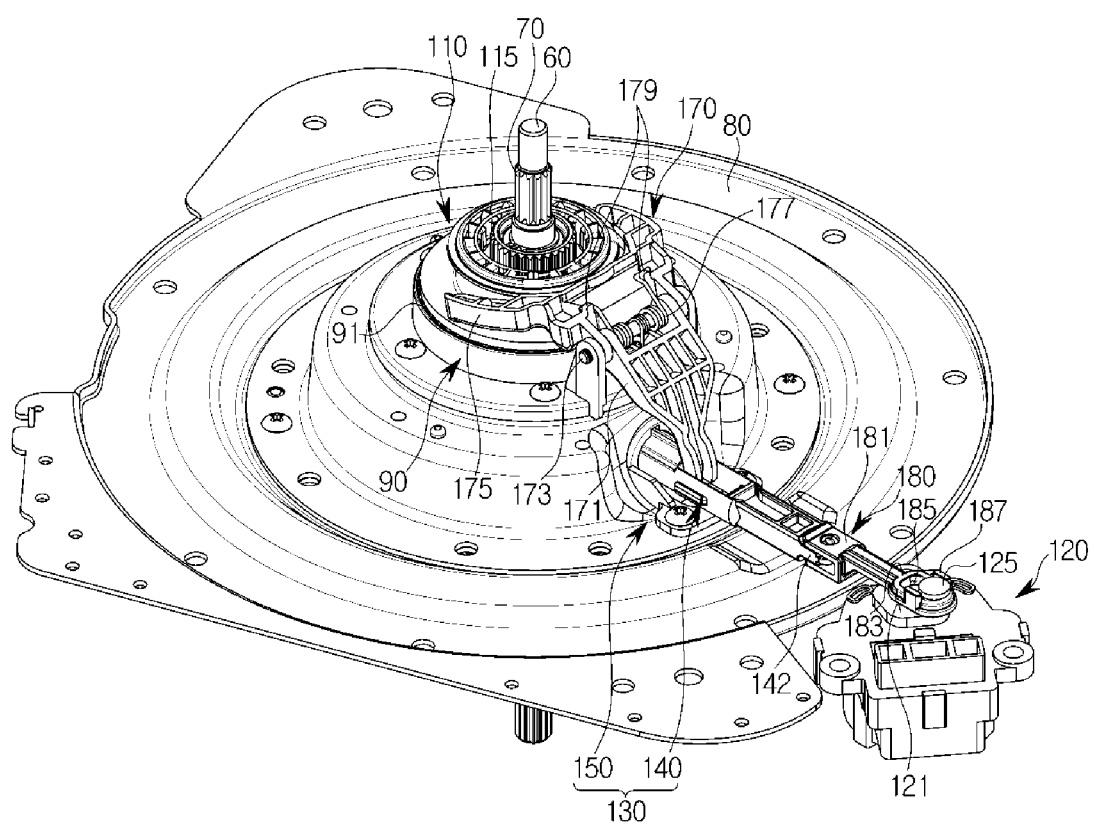
FIGS. 14A and 14B are a perspective view and a plan view illustrating positions of the cam member when the washing apparatus according to an embodiment operates in the washing mode.
Figure 14B:
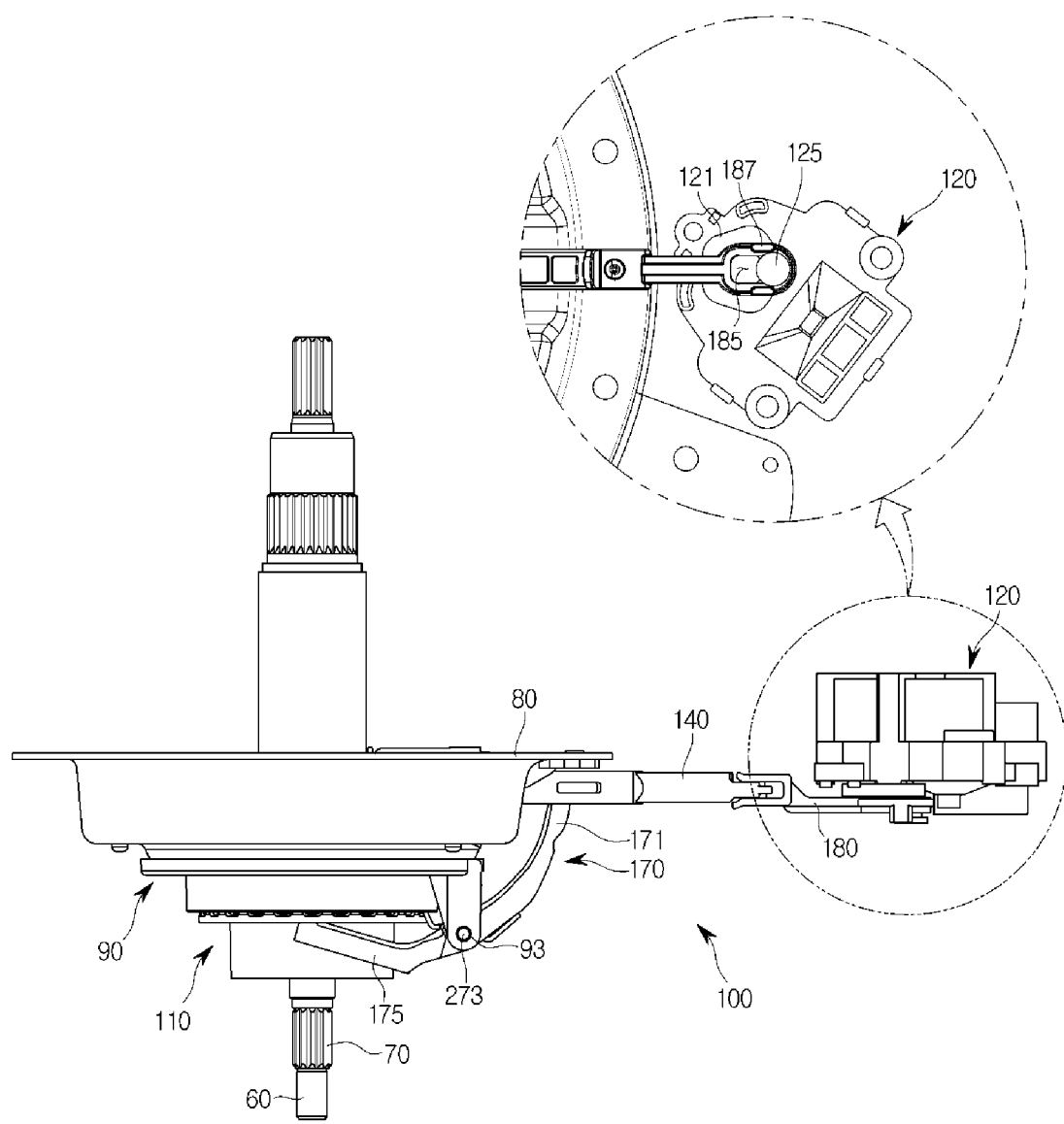
Figure 15:
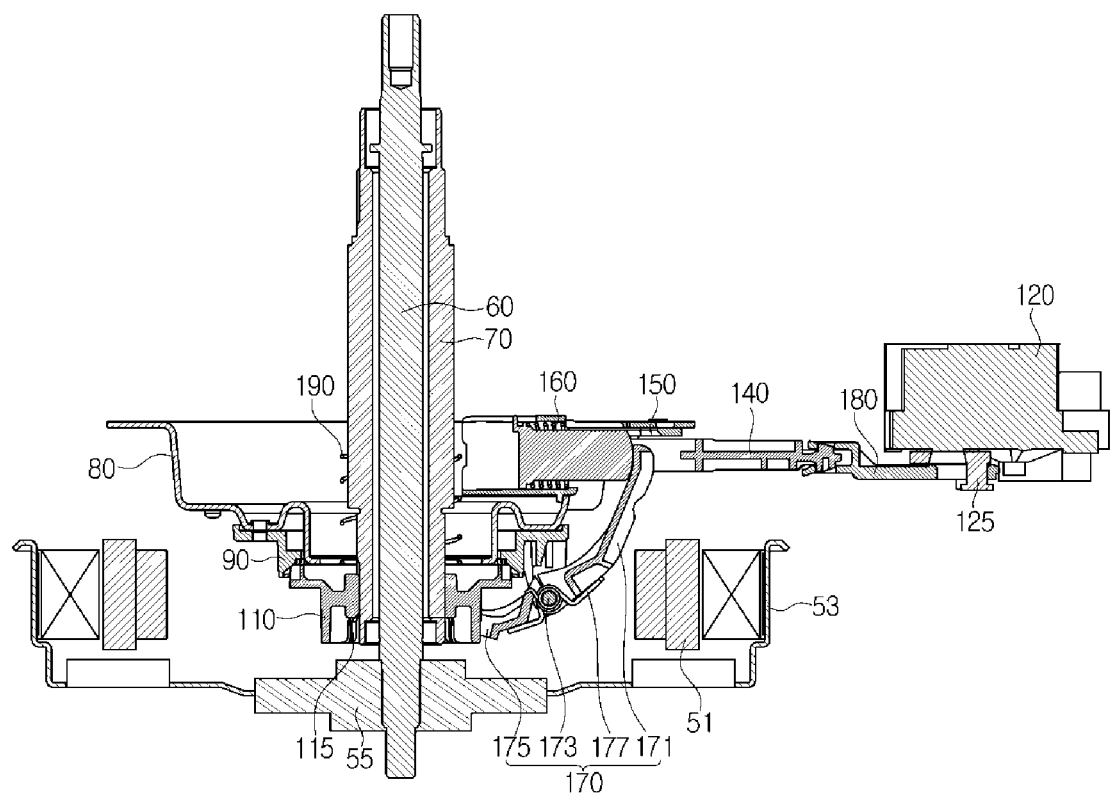
FIG. 15 is a side cross-sectional view illustrating a position of the clutch assembly when the washing apparatus according to an embodiment operates in the washing mode.

FIG. 13 is a view illustrating a structure in which the cam member rotates by supplying power to the clutch motor of the washing apparatus according to an embodiment. FIGS. 14A and 14B are a perspective view and a plan view illustrating positions of the cam member when the washing apparatus according to an embodiment operates in the washing mode. FIG. 15 is a side cross-sectional view illustrating a position of the clutch assembly when the washing apparatus according to an embodiment operates in the washing mode.

When power is supplied to the clutch motor 120, as illustrated in FIG. 13, the rotation protrusion 125 rotates clockwise together with the cam member 121. The clockwise direction is an example, and the rotation protrusion 125 may also rotate counterclockwise.

As illustrated in FIGS. 14A and 14B, power supplied to the clutch motor 120 may be turned off when the rotation protrusion 125 is located at the farthest position from the coupling 110. A rotation angle of the cam member 121 at this position may be defined as a washing mode angle. In addition, a position of the coupling 110 when the coupling 110 is coupled to the rotation prevention unit 90 may be defined as a washing mode position.

However, the spin-drying mode angle and the washing mode angle are exemplary angles applicable to the embodiments of the present disclosure, and the positions thereof are not limited so long as the rotation protrusion 125 at the spin-drying mode angle is closer than the rotation protrusion 125 at the washing mode angle.

The holding ring 183 of the connection member 180 is held by the rotation protrusion 125. Thus, as the rotation protrusion 125 rotates, the connection member 180 rotates about the connection part 181 and simultaneously moves in the radial direction of the coupling 110.

When the connection member 180 moves in the radial direction of the coupling 110, the link 140 connected to the connection member 180 linearly moves in the radial direction of the coupling 110.

When the link 140 linearly moves in the radial direction of the coupling 110, the first clutch lever 171, one end of which is connected to the link 140, is tensioned in the same direction by receiving tensile force, thereby rotating about the rotation shaft 173 clockwise as illustrated in FIG. 15.

When the first clutch lever 171 rotates clockwise about the rotation shaft 173, the second clutch lever 175 receives force from the torsion spring 177 in a direction of being folded toward the first clutch lever 171 and rotates clockwise about the rotation shaft 173 in the same manner as the first clutch lever 171.

When the second clutch lever 175 rotates clockwise about the rotation shaft 173, the other end of the second clutch lever 175 supporting the coupling 110 transmits vertical force to the coupling 110 to move the coupling 110 upward.

When the coupling 110 receives the vertical force and moves upward, the coupling 110 is detached from the hub 55, and the second toothed part 115 of the coupling 110 is disengaged from the power transmission toothed unit 57 of the hub 55, and the rotational force of the rotor 53 is not transmitted to the coupling 110.

In addition, when the coupling 110 moves upward to be in close contact with the rotation prevention unit 90, the first toothed part 113 of the coupling 110 is engaged with the rotation prevention toothed unit 91 of the rotation prevention unit 90 to prevent rotation of the coupling 110.

Since rotation of the coupling 110 is prevented, the washing mode, in which the spin-drying shaft 70 does not rotate and only the washing shaft 60 axially coupled to the hub 55 of the rotor 53 rotates, is performed.

Figure 16:
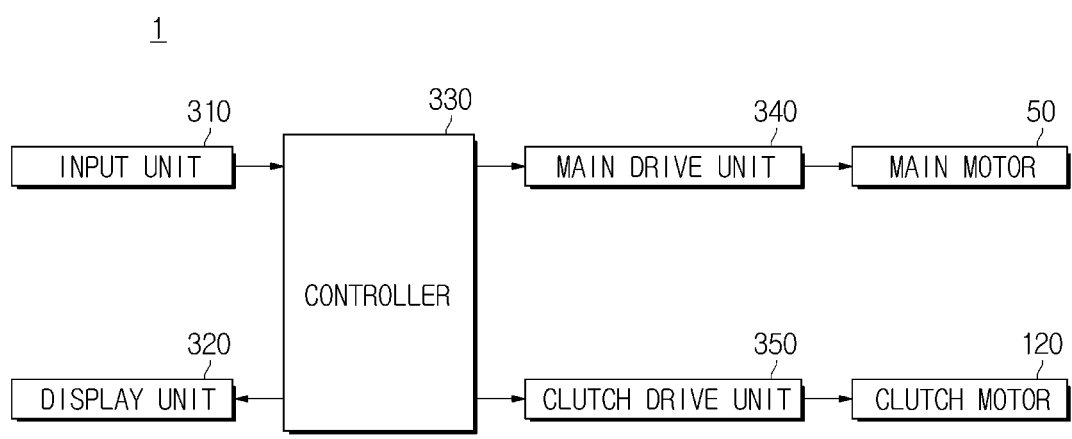
FIG. 16 is a control block diagram illustrating a washing apparatus according to an embodiment.

FIG. 16 is a control block diagram illustrating a washing apparatus according to an embodiment.

Referring to FIG. 16, the washing apparatus 1 may further include an input unit 310 configured to receive a control command from a user, a display unit 320 configured to display information about a state and operation of the washing apparatus 1 or a screen to guide a user input, a controller 330 configured to control the overall operation of the washing apparatus 1, a main drive unit 340 configured to drive the main motor 50, and a clutch drive unit 350 configured to drive the clutch motor 120.

The input unit 310 may be implemented using buttons inputting a command by pressing, touch pads inputting a command by touch manipulation, or jog shuttles inputting a command by clockwise or counterclockwise rolling or longitudinal and transversal movement. The input unit 310 may have any shape without limitation so long as it receives the control command from the user.

The display unit 320 may be a light emitting diode (LED) panel, a liquid crystal display (LCD) panel, or an organic light emitting diode (OLED) panel and may also be a touchscreen integrated with the input unit 310.

The controller 330 may appropriately control driving modes in accordance with cycles constituting a laundry cycle of the washing apparatus 1.

According to the aforementioned embodiment described above, only the washing shaft 60 rotates when the washing apparatus 1 operates in the washing mode, and the washing shaft 60 and the spin-drying shaft 70 simultaneously rotate when the washing apparatus 1 operates in the spin-drying mode. However, according to the present embodiment, the washing shaft 60 does not always rotate in the washing mode, or the washing shaft 60 and the spin-drying shaft 70 do not always rotate in the spin-drying mode.

The driving mode of the washing apparatus 1 may be determined by the state of the clutch assembly 100 whether the coupling 110 is in close contact with the hub 55 and rotational force of the main motor 50 is transmitted to the spin-drying shaft 70 (spin-drying mode), or the coupling 110 is detached from the hub 55 and coupled to the rotation prevention unit 90 (washing mode).

The controller 330 may switch the driving mode of the washing apparatus 1 between the washing mode and the spin-drying mode by controlling the main drive unit 340 that drives the main motor 50 and the clutch drive unit 350 that drives the clutch motor 120.

The controller 330 may include a memory configured to store programs to execute operations, which will be described later, and various data, and a processor configured to process data by executing the programs stored in the memory.

The memory may include at least one selected from the group consisting of a volatile memory such as static random access memory (S-RAM) and dynamic random access memory (D-RAM) and a non-volatile memory such as flash memory, read only memory (ROM), erasable programmable read only memory (EPROM), and electrically erasable programmable read only memory (EEPROM).

The non-volatile memory may operate as an auxiliary memory device of the volatile memory and maintain stored data even when the washing apparatus 1 is powered off. For example, the non-volatile memory may store control programs and control data to control operation of the washing apparatus 1.

Differently from the non-volatile memory, the volatile memory may lose stored data when the washing apparatus 1 is powered off. The volatile memory may temporarily store the control programs and control data by loading them from the non-volatile memory, temporarily store setting values or control commands input through the input unit 310, or temporarily store control signals output from a processor.

The processor may process data in accordance with a program stored in the memory or output a control signal.

The processor and the memory may be configured as a single component or plurality of components according to capacities thereof. In addition, the processor and the memory may be physically separated from each other or configured as a single chip.

Figure 17:
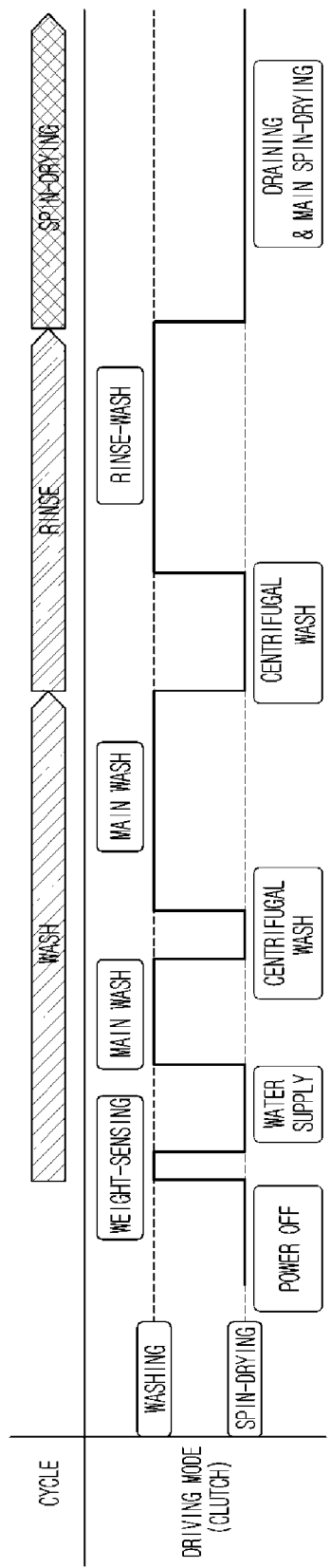
FIG. 17 is a diagram exemplarily illustrating a laundry cycle applicable to a washing apparatus according to an embodiment.

FIG. 17 is a diagram exemplarily illustrating a laundry cycle applicable to a washing apparatus according to an embodiment.

The laundry cycle illustrated in FIG. 17 may include a wash cycle, a rinse cycle, and a spin-drying cycle. However, this configuration is an example applicable to the washing apparatus 1, and the configuration of the laundry cycle may vary according to washing courses selected by the user.

The wash cycle may have a weight-sensing section to sense a weight of loaded clothes, a water supply section to supply wash water to the tub 20, a main wash section to perform washing operation by using frictional force between the wash water and the clothes by rotating the pulsator 40, and a centrifugal wash section to circulate and supply the wash water to the clothes by further rotating the pulsator 40. The main wash and the centrifugal wash may be performed more than twice, respectively.

The rinse cycle may have a rinse-preparing section to drain wash water contaminated in the wash cycle, perform an intermediate spin-drying to remove wash water contained in the clothes, and supply clean water not containing the detergent, and a rinse-wash section to rinse the clothes using supplied clean water.

The spin-drying cycle may have a draining section to drain water used to rinse the clothes during the rinse cycle, and a main spin-drying section to spin-dry the clothes by simultaneously rotating the pulsator 40 and the rotary tub 30.

As illustrated in FIG. 17, in the initial stage when the wash cycle is not started and the clutch motor 120 is not powered on, the coupling 110 is coupled to the hub 55. Thus, the driving mode of the washing apparatus 1 is the spin-drying mode. In the weight-sensing section, only the pulsator 40 is rotated by power supplied to the clutch motor 120, and thus the coupling 110 is coupled to the rotation prevention unit 90. Thus, the driving mode of the washing apparatus 1 is the washing mode.

In the water supply section, since the coupling 110 is coupled to the hub 55 again. Thus, the driving mode of the washing apparatus 1 is the spin-drying mode.

In the main wash section, the coupling 110 is decoupled from the hub 55 and coupled to the rotation prevention unit 90 to wash the clothes by rotating only the pulsator 40. Thus, the driving mode of the washing apparatus 1 is the washing mode.

In the centrifugal wash section, the coupling 110 is coupled to the hub 55 again to simultaneously rotate the pulsator 40 and the rotary tub 30. Thus, the driving mode of the washing apparatus 1 is the spin-drying mode.

In the rinse-preparing section during the rinse cycle, the coupling 110 is coupled to the hub 55 to perform drainage, intermediate spin-drying, and water supply. Thus, the driving mode of the washing apparatus 1 is the spin-drying mode.

In the rinse-wash section during the rinse cycle, the coupling 110 is decoupled from the hub 55 and coupled to the rotation prevention unit 90 to rotate only the pulsator 40. Thus, the driving mode of the washing apparatus 1 is the washing mode.

In the draining section and the main spin-drying section during the spin-drying cycle, the coupling 110 is coupled to the hub 55. Thus, the driving mode of the washing apparatus 1 is the spin-drying mode.

As described above with reference to FIG. 17, while one laundry cycle is performed, the driving modes of the washing apparatus 1 are switches several times. Thus, the controller 330 may switch the driving modes by controlling the clutch drive unit 350 in accordance with each of the sub-sections of the laundry cycle and appropriately provide rotational force to the pulsator 40 and to both the pulsator 40 and the rotary tub 30 by controlling the main drive unit 340.

Figure 18:
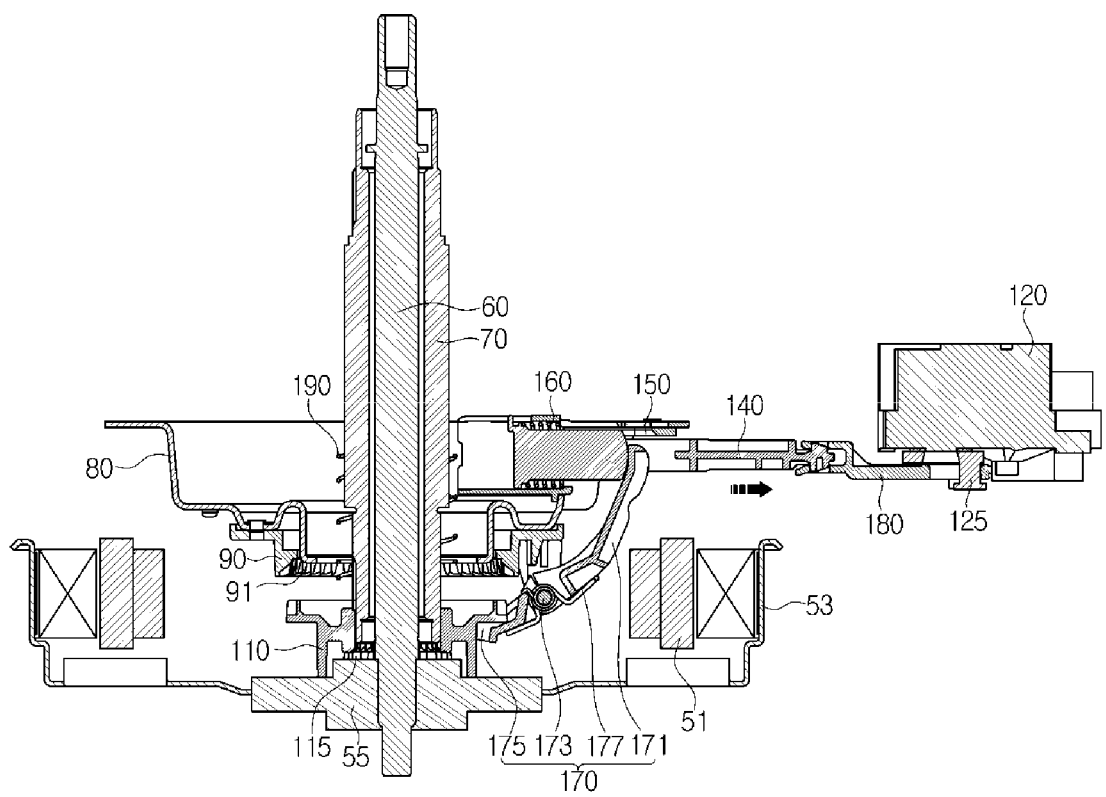
FIG. 18 is a view illustrating a restriction phenomenon occurring when a driving mode of a washing apparatus according to an embodiment is switched from a spin-drying mode to a washing mode.
Figure 19:
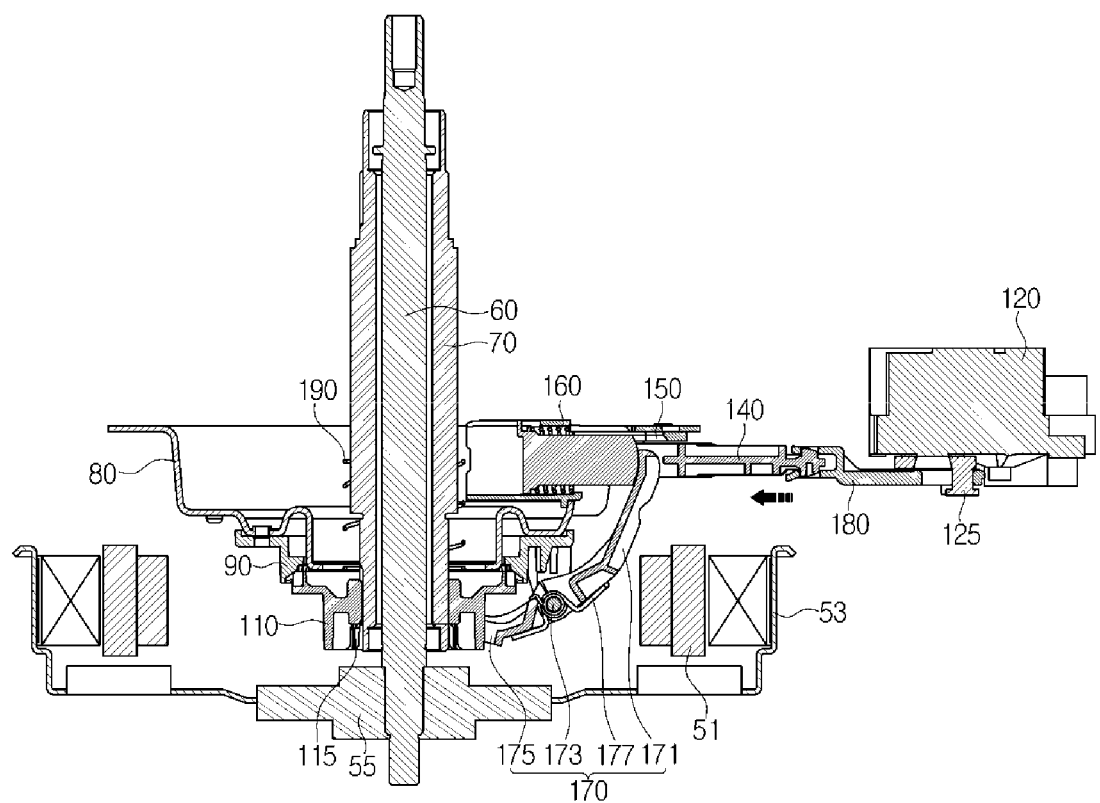
FIG. 19 is a view illustrating a restriction phenomenon occurring when a driving mode of a washing apparatus according to an embodiment from a washing mode to a spin-drying mode.

FIG. 18 is a view illustrating a restriction phenomenon occurring when a driving mode of a washing apparatus according to an embodiment is switched from a spin-drying mode to a washing mode. FIG. 19 is a view illustrating a restriction phenomenon occurring when a driving mode of a washing apparatus according to an embodiment from a washing mode to a spin-drying mode.

When the clothes are entangled around the pulsator 40, and the driving mode of the washing apparatus 1 is switched between the spin-drying mode and the washing mode, rotational force may remain in the coupling 110.

As illustrated in FIG. 18, although the cam member 121 is rotated from the spin-drying mode angle to the washing mode angle, i.e., although the link 140 connected to the clutch lever 170 is tensioned in the radial direction of the coupling 110, in order to switch the driving mode of the washing apparatus 1 from the spin-drying mode to the washing mode, the coupling state between the coupling 110 and the hub 55 may be maintained. In this case, the cam member 121 is in the washing mode, and the coupling 110 is in the spin-drying mode.

Alternatively, as illustrated in FIG. 19, although the cam member 121 is rotated from the washing mode angle to the spin-drying mode angle, i.e., although the link 140 connected to the clutch lever 170 is moved in the opposite direction of the radial direction of the coupling 110, to switch the driving mode of the washing apparatus 1 from the washing mode to the spin-drying mode, the coupling state between the coupling 110 and the rotation prevention unit 90 may be maintained. In this case, the cam member 121 is in the spin-drying mode, and the coupling 110 is in the washing mode.

In a state where the restriction phenomenon occurs as illustrated in FIG. 18, when rotational force is generated by driving the main motor 50, the coupling 110 is disengaged from the power transmission toothed unit 57 by the generated rotational force, and thus the coupling 110 may suddenly move upward by elasticity of the torsion spring 177. In this case, the rotation prevention toothed unit 91 may collide with the coupling 110 to cause a noise.

Also, in a state where the restriction phenomenon occurs as illustrated in FIG. 19, when rotational force is generated by driving the main motor 50, the coupling 110 is disengaged from the rotation prevention toothed unit 91 by the generated rotational force, and thus the coupling 110 may suddenly move downward by elasticity of the second return spring 190. In this case, the power transmission toothed unit 57 may collide with the coupling 110 to cause a noise.

Thus, the controller 330 may prevent the noise by generating the rotational force by driving the main motor 50 in a mode switching section in which a mode switching between the washing mode and the spin-drying mode is performed. Hereinafter, this will be described in more detail.

Figure 20:
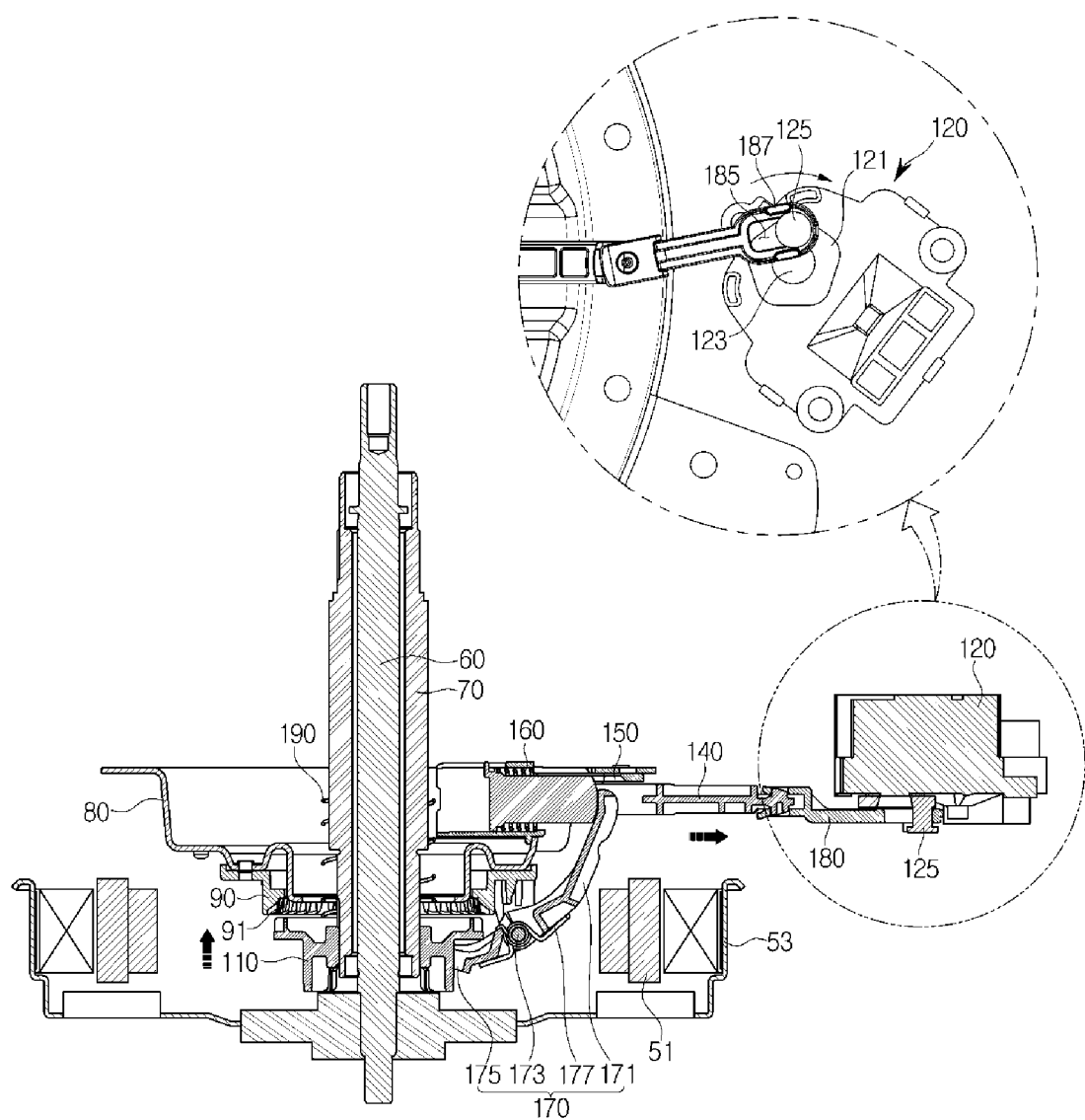
FIG. 20 is a view illustrating a rotation angle of a cam member in a mode switching section in which a driving mode of a washing apparatus according to an embodiment is switched from a spin-drying mode to a washing mode.
Figure 21:
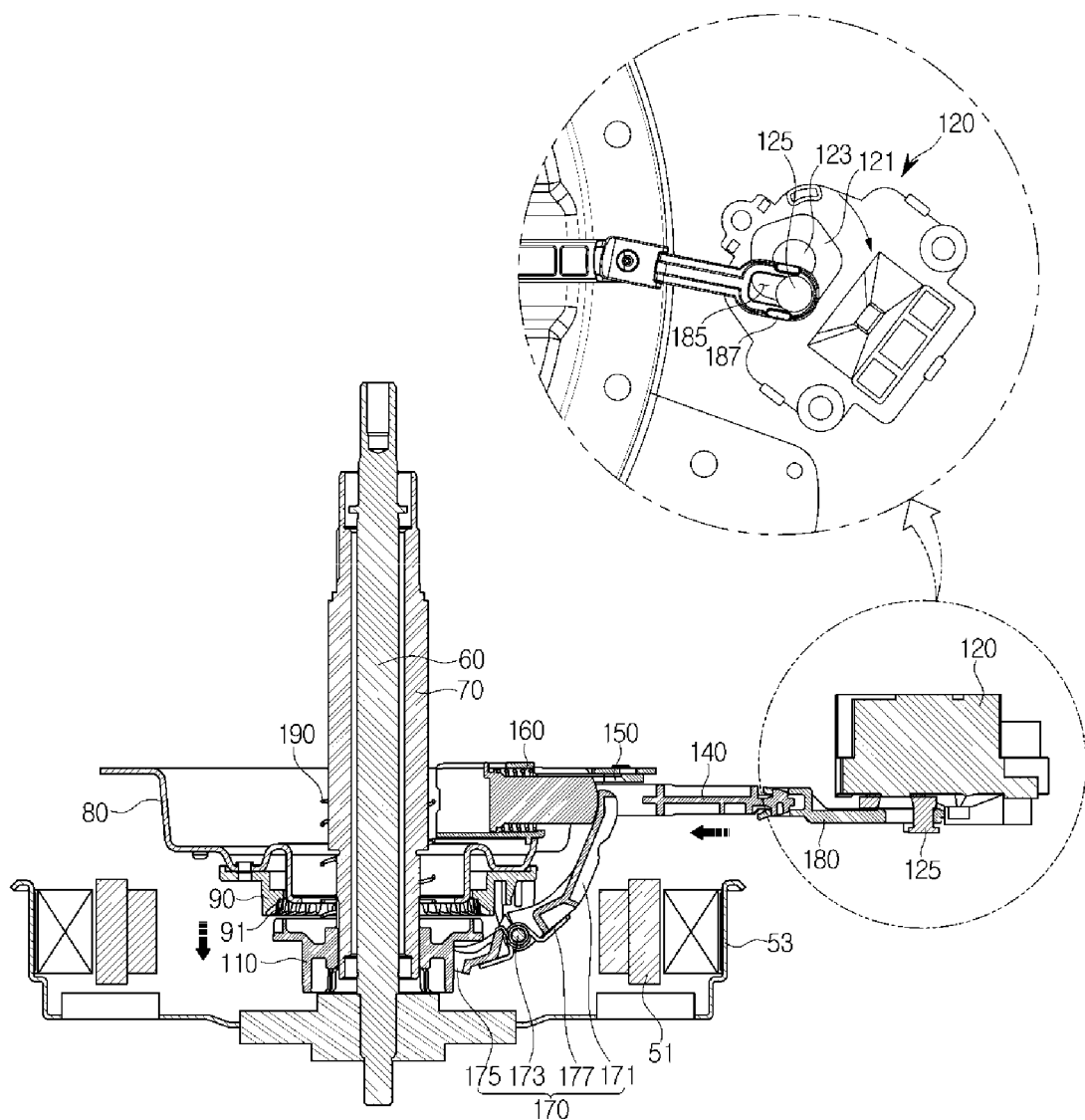
FIG. 21 is a view illustrating a rotation angle of a cam member in a mode switching section in which a driving mode of a washing apparatus according to an embodiment is switched from a washing mode to a spin-drying mode.

FIG. 20 is a view illustrating a rotation angle of a cam member in a mode switching section in which a driving mode of a washing apparatus according to an embodiment is switched from a spin-drying mode to a washing mode. FIG. 21 is a view illustrating a rotation angle of a cam member in a mode switching section in which a driving mode of a washing apparatus according to an embodiment is switched from a washing mode to a spin-drying mode.

The mode switching section according to the present embodiment refers to a section in which a rotation angle of the cam member 121 is switched between the washing mode angle and the spin-drying mode angle. It may also be referred to as a neutral section. Particularly, as illustrated in FIG. 20, the mode switching section may refer to a section in which the cam member 121 rotates from the spin-drying mode angle to the washing mode angle to switch the mode from the spin-drying mode to the washing mode, i.e., the rotation angle of the cam member 121 corresponds to neither the spin-drying mode angle nor the washing mode angle. Although FIG. 20 exemplarily illustrates a case in which the cam member 121 rotates clockwise, the rotation angle of the cam member 121 may be changed in the mode switching section in accordance with the radial direction of the cam member 121.

Although the coupling 110 may be decoupled from the hub 55 in a state of moving upward as illustrated in FIG. 20, a state in which coupling between the coupling 110 and the hub 55 is maintained by the aforementioned restriction phenomenon may also be included in the mode switching section. Thus, the mode switching section may be determined by using the rotation angle of the cam member 121.

Also, a section in which the cam member 121 rotates from the washing mode angle to the spin-drying mode angle to switch the mode from the washing mode to the spin-drying mode as illustrated in FIG. 21 also corresponds to the mode switching section. The rotation angle of the cam member 121 in the mode switching section corresponds to neither the spin-drying mode angle nor the washing mode angle.

Although the coupling 110 is decoupled from the rotation prevention unit 90 in a state of moving downward in the mode switching section from the washing mode to the spin-drying mode as illustrated in FIG. 21, a state in which coupling between the coupling 110 and the rotation prevention unit 90 is maintained by the aforementioned restriction phenomenon may also be included in the mode switching section.

Figure 22:
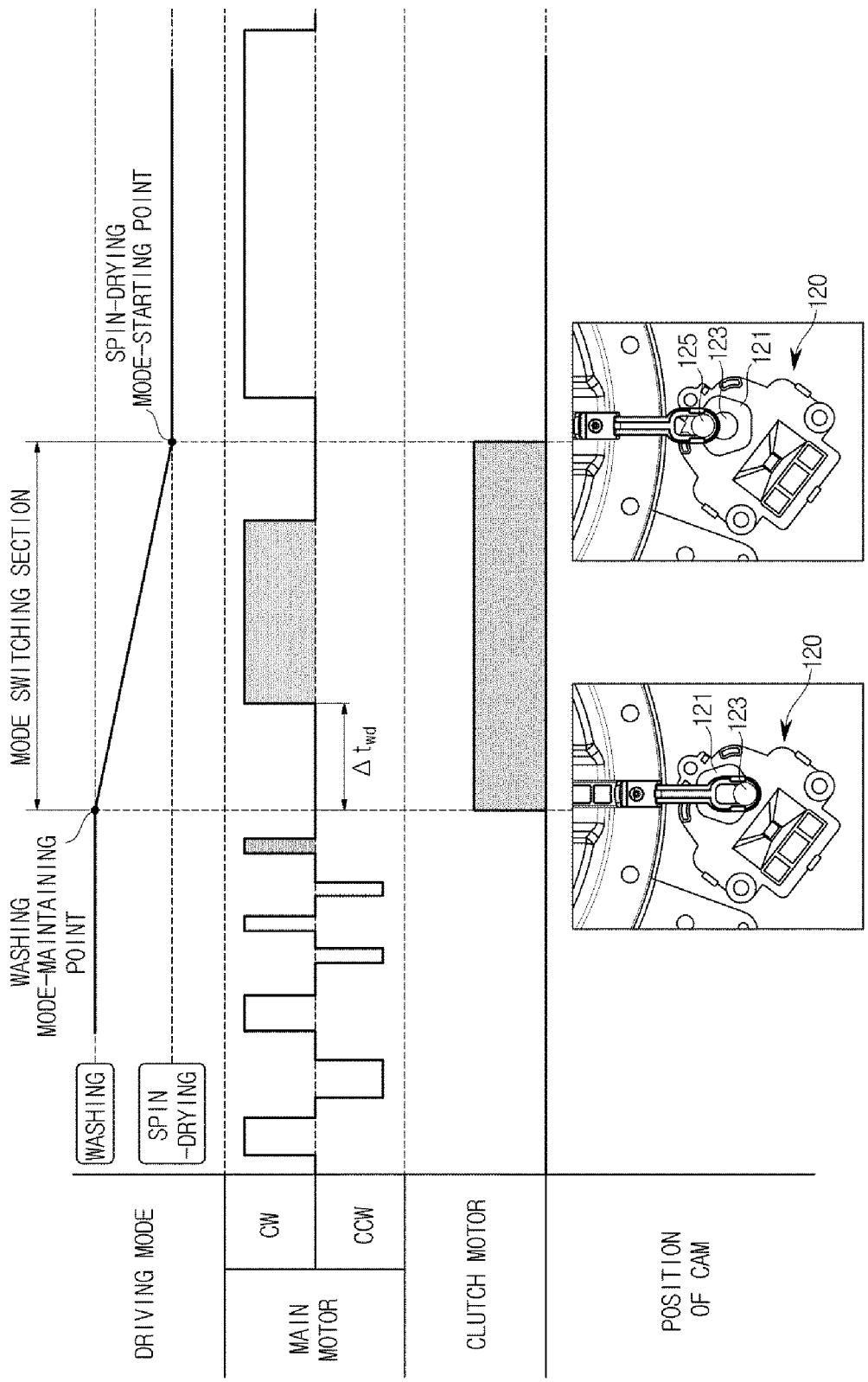
FIGS. 22 and 23 illustrate an example of timing diagrams indicating points of time when a main motor and a clutch motor of a washing apparatus according to an embodiment operate.
Figure 23:
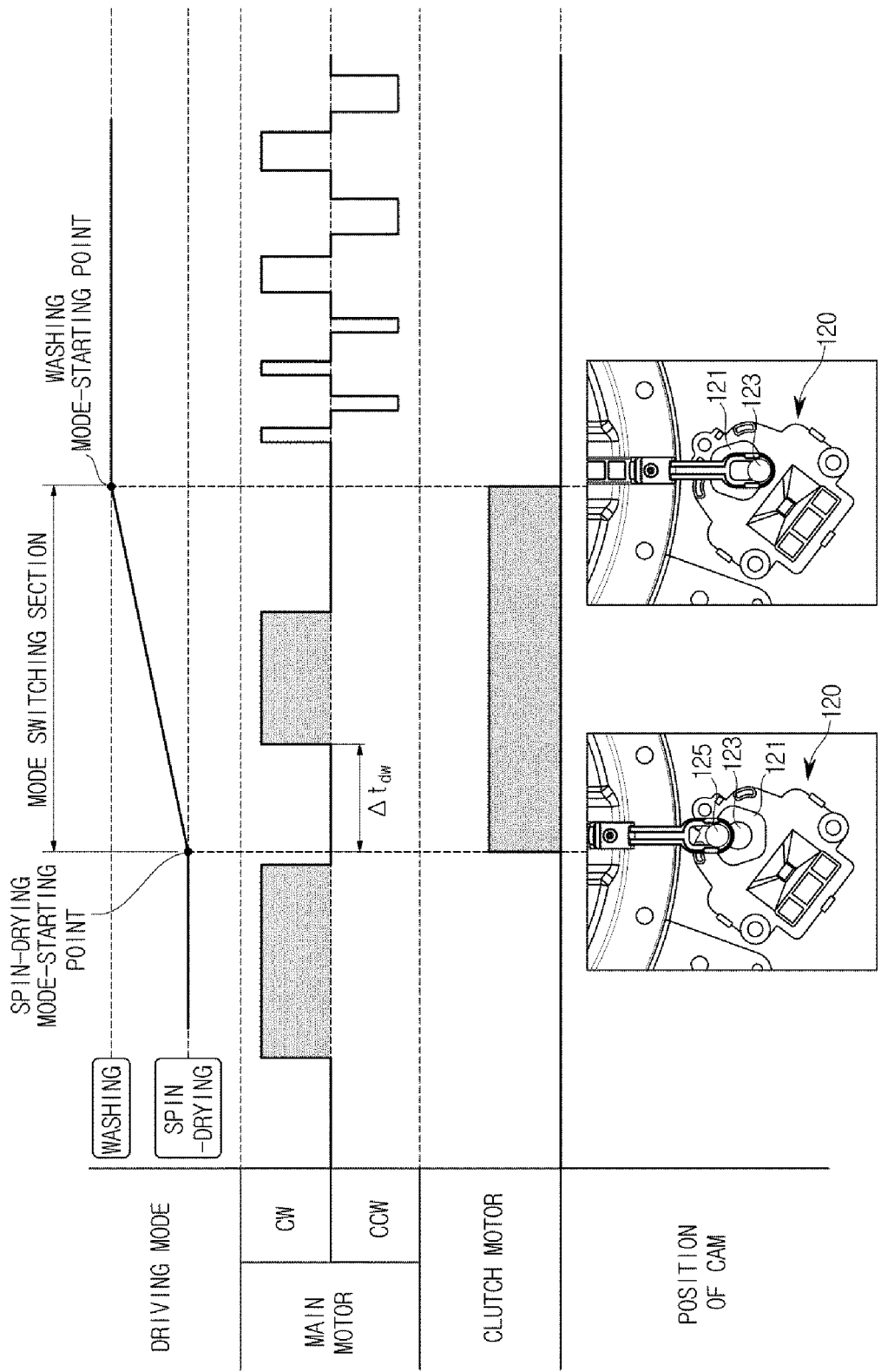

FIGS. 22 and 23 illustrate an example of timing diagrams indicating points of time when a main motor and a clutch motor of a washing apparatus according to an embodiment operate.

As illustrated in FIG. 22, the controller 330 controls the main drive unit 340 such that the main motor 50 alternately rotates clockwise CW and counterclockwise CCW in the washing mode.

When mode switching from the washing mode to spin-drying mode is started, the controller 330 controls the clutch drive unit 350 to rotate the clutch motor 120. As the clutch motor 120 rotates, the rotation angle of the cam member 121 is switched from the washing mode angle to the spin-drying mode angle.

The controller 330 controls the main drive unit 340 to rotate the main motor 50 in the mode switching section. As the main motor 50 rotates, the pulsator 40 rotates. If clothes are entangled around the pulsator 40, rotation of the pulsator 40 affects the rotary tub 30 that supports and accommodates the clothes. As the rotary tub 30 rotates in accordance with rotation of the pulsator 40, the spin-drying shaft 70 connected to the rotary tub 30 rotates. In addition, as the spin-drying shaft 70 rotates, the coupling 110 serration-coupled to the spin-drying shaft 70 rotates.

Thus, smooth decoupling of the coupling 110 from the rotation prevention unit 90 and smooth coupling of the coupling 110 to the hub 55 may be induced by rotating the main motor 50 in the mode switching section from the washing mode to the spin-drying mode.

Particularly, the controller 330 may rotate the main motor 50 at a point of time when a predetermined time period $\Delta t_{wd}$ has elapsed since the mode switching was started. This is the same as applying a time delay thereto after the mode switching is started, and thus the predetermined time period $\Delta t_{wd}$ may be referred to as a spin-drying switching delay time.

When the main motor 50 is rotated simultaneously with the start of the mode switching, horizontal force is applied to the coupling 110 at a point of time when the coupling 110 starts a vertical movement. Thus, the vertical movement of the coupling 110 is interrupted and noise reducing effects may decrease.

As such, because the main motor 50 is rotated at a point of time when the spin-drying switching delay time $\Delta t_{wd}$ has elapsed since the mode switching was started, the clutch lever 170 is not located at a position where the coupling 110 is in contact with the hub 55, and thus a noise caused by a collision that may occur when the coupling 110 is suddenly decoupled from the rotation prevention unit 90 may be prevented.

When the mode switching is completed, the controller 330 performs the spin-drying mode by rotating the main motor 50. Here, the mode switching section does not include a washing mode-maintaining point and a spin-drying mode-starting point. A driving start point of the main motor 50 may be appropriately selected within the mode switching section. A time period from the washing mode-maintaining point to the driving start point of the main motor 50 corresponds to the spin-drying switching delay time.

Meanwhile, the timing diagram of FIG. 22 illustrates on/off time points and rotation directions, but strength of signals is not considered. Thus, in the timing diagram, a strength of a signal does not correspond to an output of the motor at the corresponding time point. Accordingly, although it is illustrated that the signals have the same strength at different time points, outputs of the motor are not the same at the time points.

As illustrated in FIG. 23, the controller 330 controls the main drive unit 340 to rotate the main motor 50 clockwise CW in the spin-drying mode. However, this is an example, the main motor 50 may also rotate counterclockwise CCW.

When mode switching from the spin-drying mode to the washing mode is started, the controller 330 controls the clutch drive unit 350 to rotate the clutch motor 120. As the clutch motor 120 rotates, the rotation angle of the cam member 121 is switched from the spin-drying mode angle to the washing mode angle.

The controller 330 rotates the main motor 50 by controlling the main drive unit 340 in the mode switching section. A process in which the coupling 110 is influenced by the main motor 50 in the mode switching section is the same as that explained above with reference to FIG. 22.

In addition, when coupling between the coupling 110 and the hub 55 is maintained by a restriction phenomenon due to entanglement of the clothes, decoupling of the coupling 110 from the hub 55 may be induced by rotating the main motor 50.

Thus, by rotating the main motor 50 in the mode switching section from the spin-drying mode to the washing mode, smooth decoupling of the coupling 110 from the hub 55 and smooth coupled of the coupling 110 to the rotation prevention unit 90 may be induced.

Particularly, the controller 330 may rotate the main motor 50 after the mode switching is started, i.e., after a predetermined time period $\Delta t_{dw}$ has elapsed from the spin-drying mode-maintaining point. As described above with reference to FIG. 22, this is the same as applying a time delay thereto after the mode switching is started, and thus the predetermined time period $\Delta t_{dw}$ may be referred to as a washing switching delay time.

As such, because the main motor 50 is rotated at a point of time when the washing switching delay time $\Delta t_{dw}$ has elapsed since the mode switching was started, the clutch lever 170 is not located at the position where the coupling 110 is in contact with the rotation prevention unit 90, and thus a noise caused by a collision, which may occur when the coupling 110 is suddenly decoupled from the hub 55, may be prevented.

When the mode switching is completed, the controller 330 performs the washing mode by alternatingly rotating the main motor 50 clockwise CW and counterclockwise CCW. Here, the mode switching section does not include a spin-drying mode-maintaining point and a washing mode-starting point. A driving start point of the main motor 50 may be selected within the mode switching section. A time period from the spin-drying mode-maintaining point to the driving start point of the main motor 50 corresponds to the washing switching delay time.

Meanwhile, the time periods $\Delta t_{dw}$ and $\Delta t_{wd}$ from the start of the mode switching to the rotation of the main motor 50, i.e., delay times, may be determined by rotation speed of the clutch motor 120, positional relations between the components, and various designs thereof.

For example, a time period required for mode switching, i.e., a time period during which the rotation angle of the cam member 121 is switched from the washing mode angle to the spin-drying mode angle or from the spin-drying mode angle to the washing mode angle may be estimated as 5 seconds based on the rotation speed of the clutch motor 120, and a delay time may be selected from 1 to 3 seconds in consideration thereof.

A time period during which the rotation of the main motor 50 is maintained in the mode switching section may be preset in accordance with optimal values acquired by experiments or simulations. For example, a rotation maintenance time of the main motor 50 may be selected from 1 to 4 seconds.

Meanwhile, although the clutch motor 120 operates only in the mode switching section according to the present embodiment, design modification of the clutch assembly 100 may be performed. For example, when the clutch motor 120 is powered off, tensile force applied to the clutch lever 170 is removed, thereby switching the mode to the spin-drying mode. In this case, the controller 330 may also rotate the main motor 50 in the mode switching section.

Figure 24:
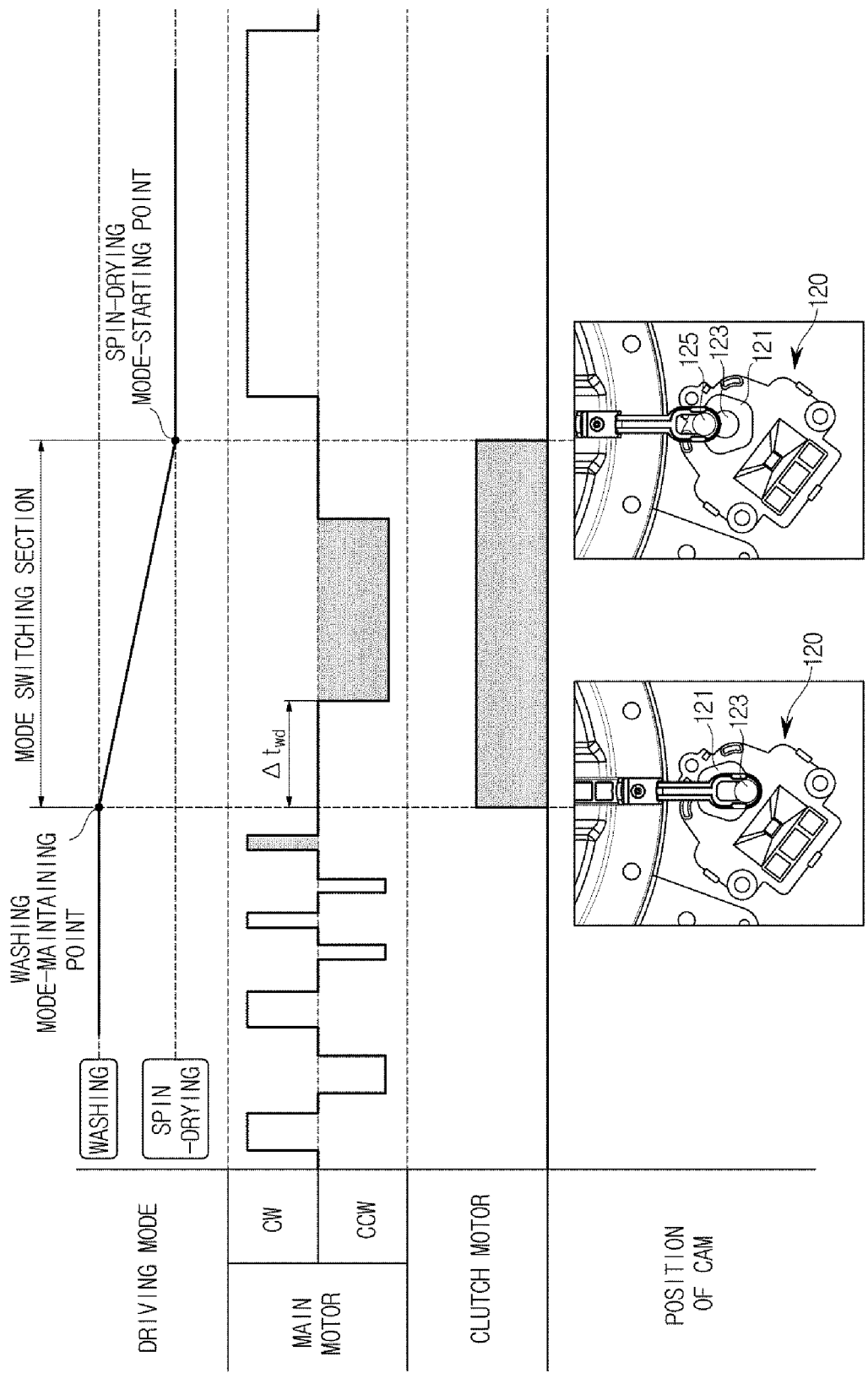
FIGS. 24 and 25 illustrate another example of timing diagrams indicating points of time when the main motor and the clutch motor of the washing apparatus according to an embodiment operate.
Figure 25:
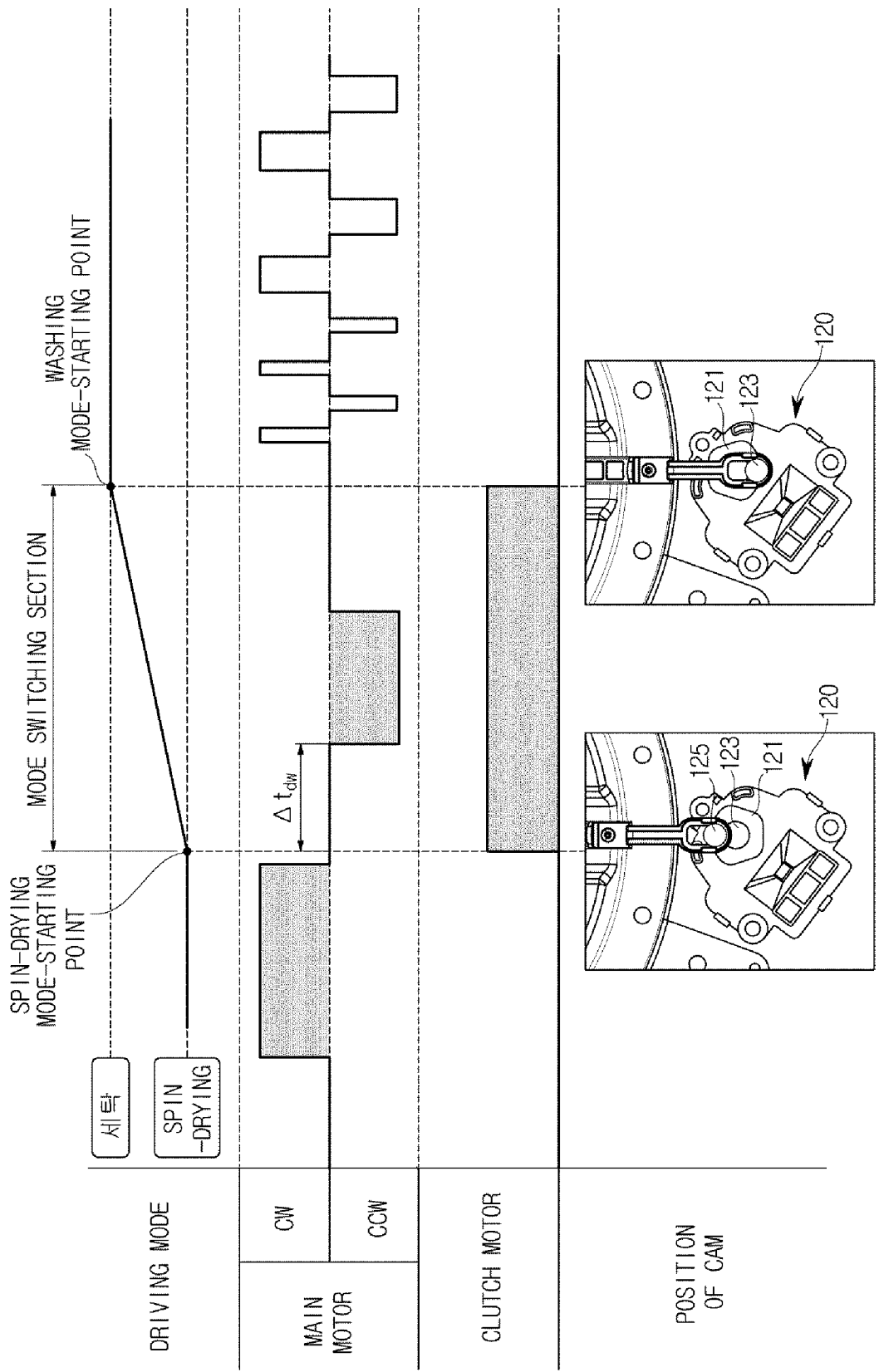

FIGS. 24 and 25 illustrate another example of timing diagrams indicating points of time when the main motor and the clutch motor of the washing apparatus according to an embodiment operate.

If a restriction phenomenon occurs in the mode switching section from the washing mode to the spin-drying mode, the coupling 110 receives downward force. In this case, decoupling of the coupling 110 from the rotation prevention unit 90 may be facilitated by rotating the main motor 50 counterclockwise CCW that is a direction opposite to the previous rotation direction (clockwise CW), before the mode switching is started, as illustrated in FIG. 24.

Also, when a restriction phenomenon occurs in the mode switching section from the spin-drying mode to the washing mode, the coupling 110 receives upward force from the clutch lever 170. In this case, decoupling of the coupling 110 from the hub 55 may be facilitated by rotating the main motor 50 counterclockwise CCW that is a direction opposite to the previous rotation direction (clockwise CW), before the mode switching is started, as illustrated in FIG. 25.

Meanwhile, since the driving mode is determined and the mode switching section is judged according to the rotation angle of the cam member 121, the controller 330 may determine a control time point of the main motor 50 based on the rotation angle of the cam member 121. Hereinafter, this will be described with reference to FIGS. 26 and 27.

Figure 26:
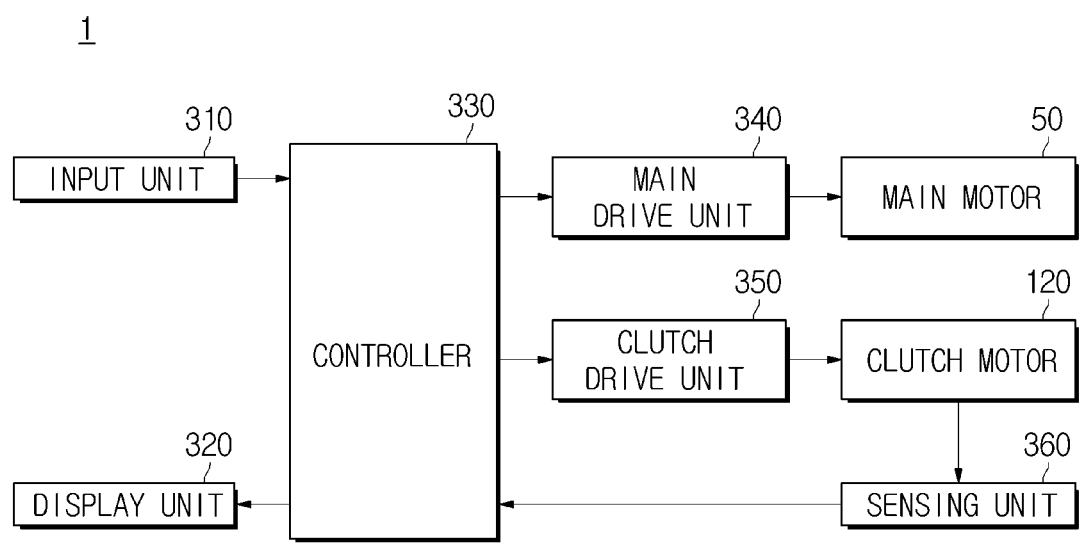
FIG. 26 is a control block diagram illustrating a washing apparatus according to an embodiment further including a sensing unit that senses a rotation angle of a cam member.

FIG. 26 is a control block diagram illustrating a washing apparatus according to an embodiment further including a sensing unit that senses a rotation angle of a cam member.

Referring to FIG. 26, the washing apparatus 1 may further include a sensing unit 360 that senses the rotation angle of the cam member 121.

The sensing unit 360 may be implemented using a contact sensor, an optical sensor, an ultrasound sensor, an infrared sensor, and the like. When implemented using the contact sensor, the sensing unit 360 may output a signal corresponding to a direct contact of a portion of the cam member 121 with the sensing unit 360. When implemented using the optical sensor, the ultrasound sensor, or the infrared sensor, the sensing unit 360 may sense a mark indicating a particular rotation angle of the cam member 121 although the sensing unit 360 is not in direct contact with the cam member 121.

For example, if the sensing unit 360 is a contact sensor, the sensing unit 360 may output an ON signal when the rotation angle of the cam member 121 is within a predetermined range and may be turned off when the rotation angle is out of the predetermined range.

Alternatively, the cam member 121 may be provided with a home position mark and the rotation angle of the cam member 121 may be estimated based on the home position mark such that the sensing unit 360 is turned on when the cam member 121 is located at a predetermined rotation angle.

The controller 330 may control the clutch motor 120 or the main motor 50 based on output signals of the sensing unit 360. The controller may estimate the rotation angle of the cam member 121 based on the output signal of the sensing unit 360 and may determine driving timing of the clutch motor 120 or the main motor 50 based on the rotation angle of the cam member 121.

Figure 27:
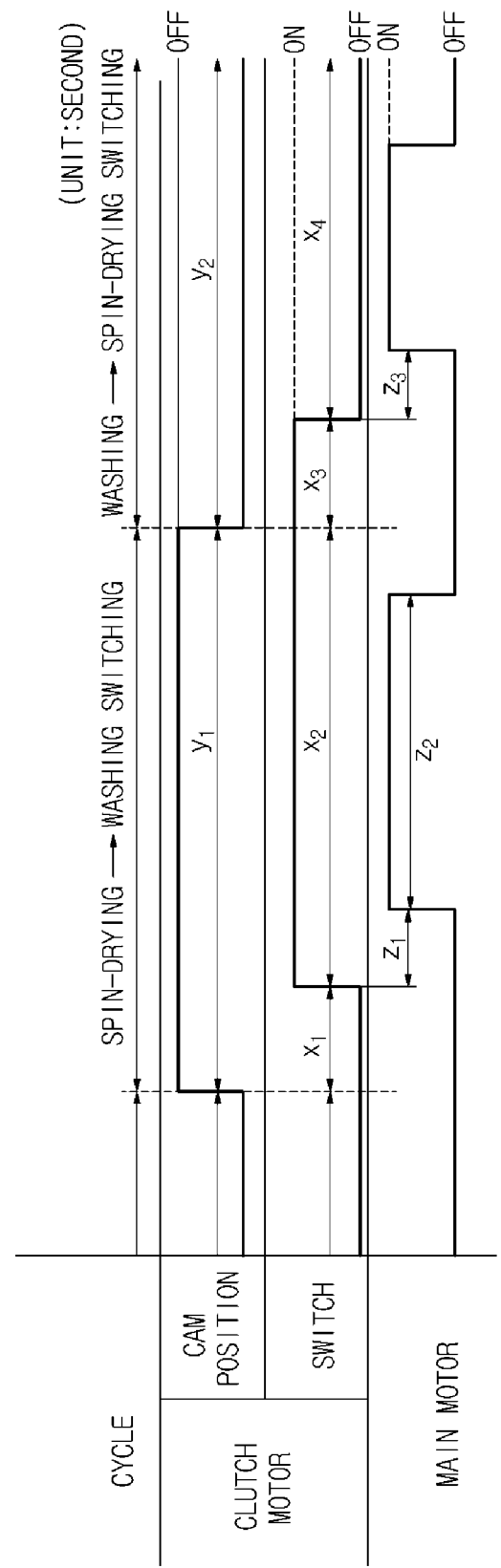
FIG. 27 is a timing diagram illustrating driving timing of a main motor determined by a controller of a washing apparatus according to an embodiment based on output signals of a sensing unit.

FIG. 27 is a timing diagram illustrating driving timing of a main motor determined by a controller of a washing apparatus according to an embodiment based on output signals of a sensing unit. FIG. 27 illustrates a sensing unit 360 that outputs an ON signal when the rotation angle of the cam member 121 is within a predetermined range and is turned off when the rotation angle is out of the range.

The timing diagram of FIG. 27 illustrates a case in which the mode is switched from the spin-drying mode to the washing mode and then immediately switched back to the spin-drying mode for descriptive convenience.

Referring to FIG. 27, if the clutch motor 120 is rotated by supplying power thereto for mode switching from the spin-drying mode to the washing mode, the sensing unit 360 outputs an ON signal after $x_1$ seconds. The controller 330 may estimate a rotation angle of the cam member 121 at a certain point of time based on a time difference from the point of time when the sensing unit 360 outputs the ON signal and rotation speed of the clutch motor 120. For example, the controller 330 may estimate that the rotation angle of the cam member 121 will be located at a neutral position after $z_1$ seconds from the output of the ON signal and rotate the main motor 50 for smooth coupling of the coupling 110 to the rotation prevention unit 90 after $z_1$ seconds.

The controller 330 may pre-store information about a time period ($y_1$) required for the mode switching and estimate that the mode switching will be completed after $x_2$ seconds from the output of the ON signal. In consideration thereof, the controller 330 may stop the main motor 50 at $z_2$ seconds after rotation of the main motor 50 is started.

Then, mode switching from the washing mode to the spin-drying mode may be performed for $y_2$ seconds from a point of time when the mode switching from the spin-drying mode to the washing mode is completed.

When the sensing unit 360 is turned off at $x_3$ seconds after the mode switching to the washing mode is completed, the controller 330 may estimate that the rotation angle of the cam member 121 will be located at the neutral position at $z_3$ seconds after the sensing unit 360 is turned off and rotate the main motor 50 for smooth coupling between the coupling 110 and the hub 55 after $z_3$ seconds.

The aforementioned washing switching delay time $\Delta t_{dw}$ may correspond to $x_1+z_1$, and the spin-drying switching delay time $\Delta t_{wd}$ may correspond to $x_3+z_3$. The washing switching delay time $\Delta t_{dw}$ and the spin-drying switching delay time $\Delta t_{wd}$ may be the same or different in accordance with rotation speed of the clutch motor 120, positional relations between the components, and various designs thereof.

According to results of measuring respective time periods during an experiment, the sensing unit 360 output an ON signal at 1.29 seconds ($x_1$) after the mode switching from the spin-drying mode to the washing mode was started, and the coupling 110 was decoupled from the hub 55 and the cam member 121 was located in a neutral section at 0.7 ($z_1$) seconds after the sensing unit 360 output the ON signal. Thus, the main motor 50 was rotated for 2 seconds ($z_2$) at 0.7 seconds after the sensing unit 360 output the ON signal.

The mode switching from the spin-drying mode to the washing mode was completed at 3.86 seconds ($x_2$) after the sensing unit 360 output the ON signal, and the sensing unit 360 was turned off at 1.25 seconds ($x_3$) after the mode switching was completed.

In the experiment, the mode switching from the washing mode to the spin-drying mode was performed immediately after the mode switching from the spin-drying mode to the washing mode. The mode switching from the washing mode to the spin-drying mode took 4.85 seconds ($y_2$).

The coupling 110 was decoupled from the rotation prevention unit 90 and the cam member 121 is located in the neutral section at 0.25 seconds ($z_3$) after the sensing unit 360 was turned off. Thus, the main motor 50 was rotated at 0.25 seconds ($z_3$) after the sensing unit 360 was turned off.

According to the experiment, decoupling of the coupling 110 from the hub 55 or decoupling of the coupling 110 from the rotation prevention unit 90 may be facilitated and a noise caused by the collision between the coupling 110 and the rotation prevention unit 90 or between the coupling 110 and the hub 55 may be reduced by setting the washing switching delay time $\Delta t_{dw}$ to 1.36 seconds and the spin-drying switching delay time $\Delta t_{wd}$ to 1.5 seconds in the mode switching section.

However, values applied to these parameters ($x_1$, $x_2$, $y_1$, $z_1$, and $z_2$) are exemplarily described and optimal values applicable to the parameters may vary in accordance with rotation speed of the clutch motor 120, positional relations between the components, and various designs thereof.

Although the controller 330 determines driving timing of the main motor 50 based on the output signal of the sensing unit 360 according to the present embodiment, embodiments of the washing apparatus 1 are not limited thereto. The controller 330 may also determine the driving timing of the main motor 50 by using algorithms to perform the laundry cycle. For example, the controller 330 may operate the main motor 50 at a washing switching delay time or a spin-drying switching delay time after power is supplied to the clutch motor 120 upon determination that the mode switching is required.

Figure 28:
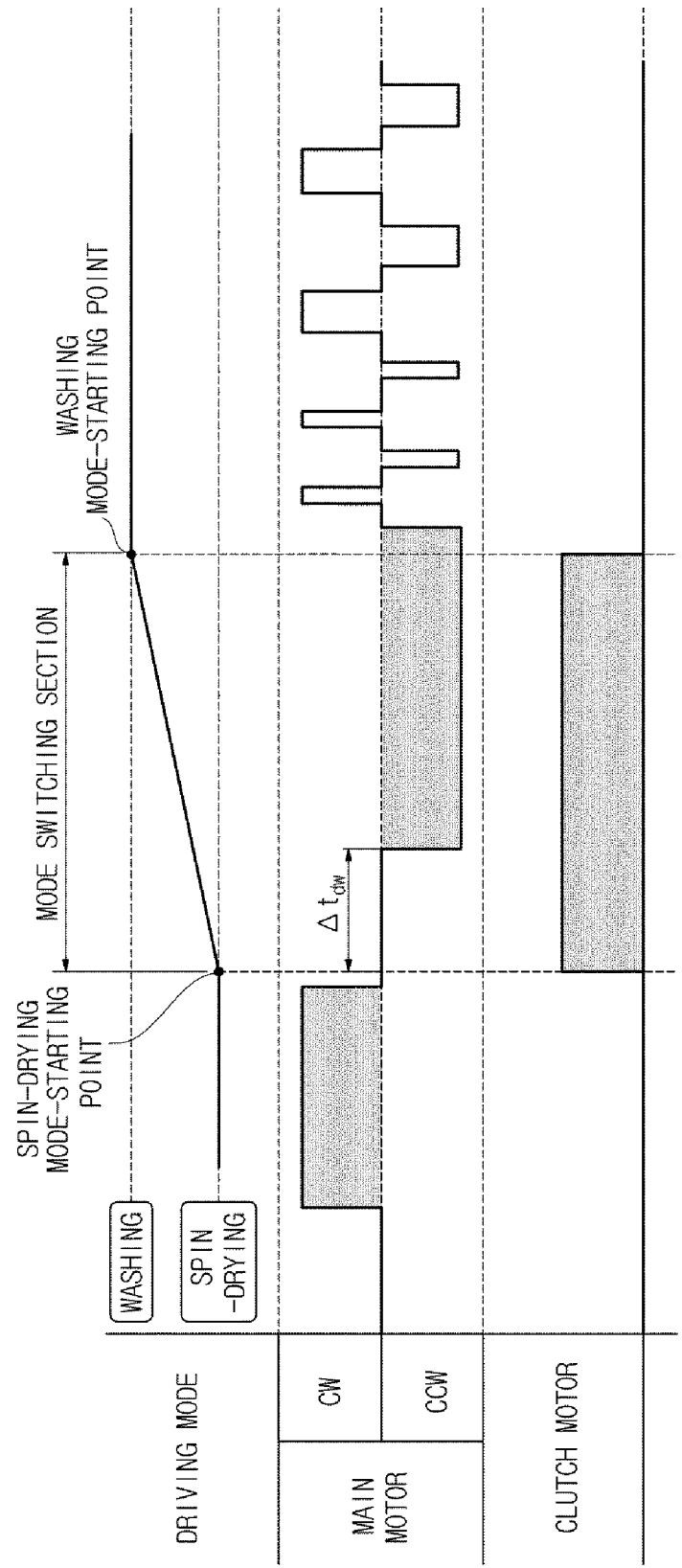
FIG. 28 is a timing diagram illustrating that rotation of a main motor is maintained after mode switching is completed in a washing apparatus according to an embodiment.

FIG. 28 is a timing diagram illustrating that rotation of a main motor is maintained after mode switching is completed in a washing apparatus according to an embodiment.

Referring to FIG. 28, the controller 330 may rotate the main motor 50 when a washing switching delay time $\Delta t_{dw}$ has elapsed after the mode switching from the spin-drying mode to the washing mode was started.

The rotation of the main motor 50 may be maintained for a predetermined time period from the washing mode-starting point or washing mode-starting point, when the mode switching is completed. When the rotation of the main motor 50 is maintained for the predetermined time period, coupling between the rotation prevention unit 90 and the coupling 110 may be more efficiently induced.

Hereinafter, a method of controlling a washing apparatus according to an embodiment will be described. Embodiments of the washing apparatus 1 described above may be applied to the method of controlling the washing apparatus. Thus, descriptions given with reference to FIGS. 1 to 28 may also be applied to the method of controlling the washing apparatus.

Figure 29:
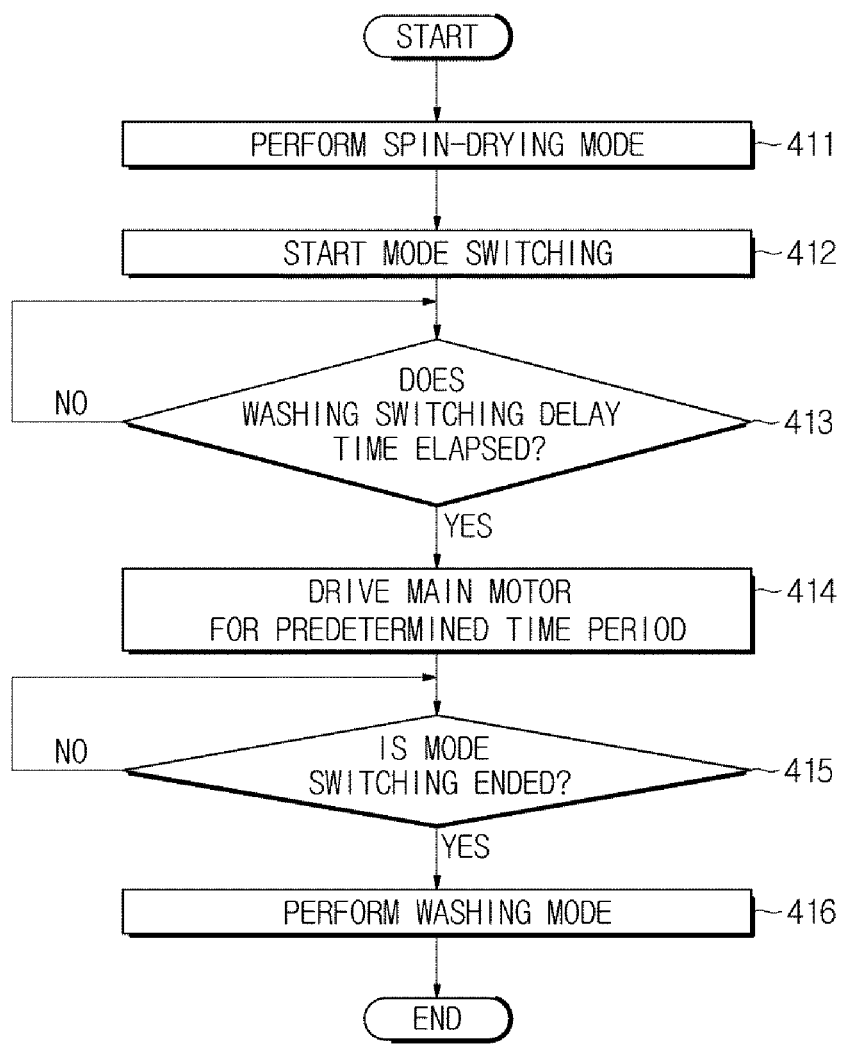
FIG. 29 is a flowchart illustrating a mode switching process from a spin-drying mode to a washing mode in a method of controlling a washing apparatus according to an embodiment.

FIG. 29 is a flowchart illustrating a mode switching process from a spin-drying mode to a washing mode in a method of controlling a washing apparatus according to an embodiment.

Referring to FIG. 29, the washing apparatus 1 performs a spin-drying mode (411). Performing the spin-drying mode may indicate that a rotation angle of the cam member 121 is switched to a spin-drying mode angle or that the rotation angle of the cam member 121 is in an initial stage corresponding to the spin-drying mode angle. That is, the spin-drying mode may be performed in the water supply section, the centrifugal wash section, or the rinse-preparing section as described above with reference to FIG. 17 or may indicate that the washing apparatus is in the initial stage before the weight-sensing process for the laundry cycle is started. In addition, if the restriction phenomenon due to entanglement of the clothes does not occur, the spin-drying mode may indicate that the coupling 110 is coupled to the hub 55 of the main motor 50.

Mode switching from the spin-drying mode to the washing mode is started (412). The mode switching may be performed at a point of time when the driving mode enters a weight-sensing section to start a wash cycle, enters a main wash section after a water supply, or enters the main wash section again after a centrifugal wash. Since these points of time are preset in accordance with types of laundry cycles, the controller 330 may determine each point of time and start mode switching. For mode switching from the spin-drying mode to the washing mode, the controller 330 rotates the cam member 121 by driving the clutch motor 120. The rotation angle of the cam member 121 is switched from the spin-drying mode angle to the washing mode angle by rotating the cam member 121 clockwise CW or counter-clockwise CCW.

After a washing switching delay time $\Delta t_{dw}$ from a mode switching start (Yes of 413), the main motor 50 is rotated for a predetermined time period (414). The washing switching delay time $\Delta t_{dw}$ may be preset, and the time period during which rotation of the main motor 50 is maintained may also be preset. For example, if a point of time to control the main motor 50 is determined in accordance with the output signal of the sensing unit 360, the sensing unit 360 mounted on the clutch motor 120 may output an ON signal at a predetermined time period ($x_1$) after rotation of the clutch motor 120 is started to move the cam member 121.

The controller 330 may estimate or pre-store the time periods based on the position of the sensing unit 360 and rotation speed of the clutch motor 120 and may also pre-store information about a time period ($z_1$ seconds) after which driving of the main motor 50 is started after the sensing unit 360 outputs an ON signal. That is, a sum of a time period from starting mode switching to ON signal-outputting of the sensing unit 360 and a time period from ON signal-outputting of the sensing unit 360 to driving the main motor 50 corresponds to the washing switching delay time $\Delta t_{dw}$. Thus, rotating the main motor 50 after the washing switching delay time $\Delta t_{dw}$ from the starting of the mode switching may be the same as rotating the main motor 50 after $z_1$ seconds from the ON signal-outputting of the sensing unit 360.

Meanwhile, the rotation direction of the main motor 50 may be opposite to a rotation direction thereof before the mode switching is started. In this case, decoupling of the coupling 110 from the hub 55 may be more smoothly performed.

After the mode switching is completed (Yes of 415), power supplied to the clutch motor 120 is blocked and the washing mode is performed (416).

Figure 30:
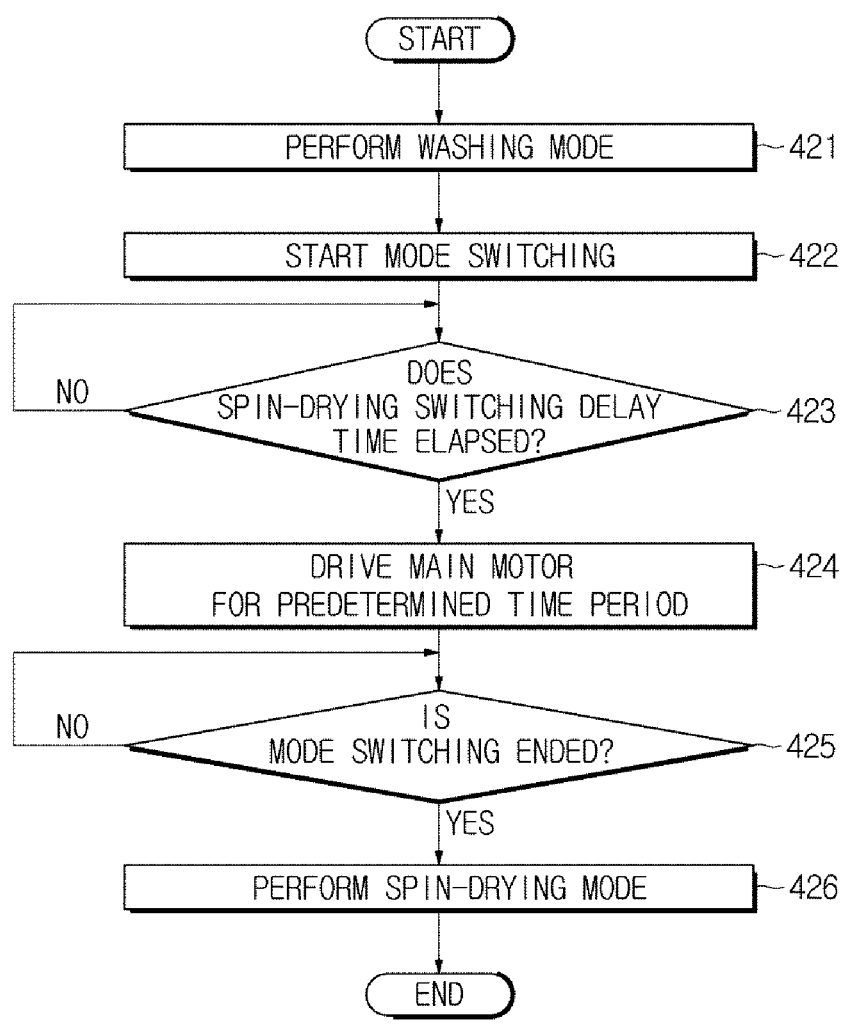
FIG. 30 is a flowchart illustrating a mode switching process from a washing mode to a spin-drying mode in a method of controlling a washing apparatus according to an embodiment.

FIG. 30 is a flowchart illustrating a mode switching process from a washing mode to a spin-drying mode in a method of controlling a washing apparatus according to an embodiment.

Referring to FIG. 30, the washing apparatus 1 performs a washing mode (421). Performing the washing mode may indicate that the rotation angle of the cam member 121 is maintained at the washing mode angle. That is, the washing mode may be performed in the weight-sensing section, the main wash section, or the rinse-wash section as described above with reference to FIG. 17. In addition, if the restriction phenomenon due to entanglement of the clothes does not occur, the washing mode may indicate that the coupling 110 is coupled to the rotation prevention unit 90 of the main motor 50.

Mode switching from the washing mode to the spin-drying mode is started (422). The mode switching may be performed at a point of time when the driving mode enters a water supply section after sensing a weight of clothes, enters a centrifugal wash section after a main wash, or enters a spin-drying section after a rinse-wash section. Since these points of time are preset in accordance with types of laundry cycles, the controller 330 may determine each point of time and start mode switching. For mode switching from the washing mode to the spin-drying mode, the controller 330 rotates the cam member 121 by driving the clutch motor 120. The rotation angle of the cam member 121 is switched from the washing mode angle to the spin-drying mode angle by rotating the cam member 121 clockwise CW or counterclockwise CCW.

After a spin-drying switching delay time $\Delta t_{wd}$ from a mode switching start (Yes of 423), the main motor 50 is rotated for a predetermined time period (424). The spin-drying switching delay time $\Delta t_{wd}$ may be preset, and the time period during which rotation of the main motor 50 is maintained may also be preset. For example, if a point of time to control the main motor 50 is determined in accordance with the output signal of the sensing unit 360, the sensing unit 360 mounted on the clutch motor 120 may output an ON signal at a predetermined time period ($x_1$) after rotation of the clutch motor 120 is started to move the cam member 121.

The controller 330 may estimate or pre-store the time periods based on the position of the sensing unit 360 and rotation speed of the clutch motor 120 and may also pre-store information about a time period ($z_3$ seconds) after which driving of the main motor 50 is started after the sensing unit 360 outputs an ON signal. That is, a sum of a time period from starting mode switching to ON signal-outputting of the sensing unit 360 and a time period from ON signal-outputting of the sensing unit 360 to driving the main motor 50 corresponds to the spin-drying switching delay time $\Delta t_{wd}$. Thus, rotating the main motor 50 after the spin-drying switching delay time $\Delta t_{wd}$ from the starting of the mode switching may be the same as rotating the main motor 50 after $z_3$ seconds from the ON signal-outputting of the sensing unit 360.

Meanwhile, the rotation direction of the main motor 50 may be opposite to a rotation direction thereof before the mode switching is started. In this case, decoupling of the coupling 110 from the rotation prevention unit 90 may be more smoothly performed.

After the mode switching is completed (Yes of 425), power supplied to the clutch motor 120 is blocked and the spin-drying mode is performed (426).

According to the aforementioned embodiments, coupling of the coupling 110 to the main motor 50 or the rotation prevention unit 90 and decoupling of the coupling 110 from the main motor 50 or the rotation prevention unit 90 may be smoothly induced during mode switching between the spin-drying mode and the washing mode, and noises caused by collisions due to sudden decoupling thereof may be reduced.

As the embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

Although the exemplary embodiments of the present disclosure have been provided for illustrative purposes, those skilled in the art will appreciate that various modifications are possible, without departing from the scope and spirit of the disclosure as disclosed in the accompanying claims.

The terms used in the present specification are merely used to describe particular embodiments, and are not intended to limit the present disclosure.

An expression used in the singular encompasses the expression of the plural, unless it has a clearly different meaning in the context.

In the present specification, it is to be understood that the terms such as "including" or "having," etc., are intended to indicate the existence of the features, numbers, operations, components, parts, or combinations thereof disclosed in the specification, and are not intended to preclude the possibility that one or more other features, numbers, operations, components, parts, or combinations thereof may exist or may be added.

It will be understood that, although the terms "first", "second", etc., may be used herein to describe various elements, these elements should not be limited by these terms. The above terms are used only to distinguish one component from another.

In addition, the terms "unit", "device," "block", "member", and "module" used herein refer to a unit which can be embodied as software stored in a memory, hardware such as field-programmable gate array (FPGA) or application specific integrated circuit (ASIC), or a combination thereof, for processing at least one function and performing an operation. However, the terms "unit", "device," "block", "member", and "module" are not limited to software or hardware. The "unit", "device," "block", "member", and "module" may be stored in a storage medium and implemented by one or more processors.

As is apparent from the above description, according to the washing apparatus and the control method thereof according to the present disclosure, noises caused while the position of the coupling is switched may be reduced by controlling driving timing of the main motor that provides rotational force to the washing shaft and spin-drying shaft during mode switching between the washing mode and the spin-drying mode.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A washing apparatus comprising:
  a main motor configured to generate a rotational force and provide the rotational force to a washing shaft;
  a coupling disposed above the main motor and configured to selectively transmit the rotational force of the main motor to a spin-drying shaft by vertically moving;
  a clutch motor configured to generate a tensile force in a radial direction of the coupling;
  a clutch lever configured to decouple the main motor from the coupling by moving the coupling upward using the tensile force of the clutch motor; and
  a controller configured to:
    rotate the main motor in at least part of a mode switching operation, and
    maintain a rotation of the main motor for a predetermined time period after the mode switching operation is ended, wherein the rotation of the main motor is continuously maintained in a single direction through an end of the mode switching operation and the predetermined time period after the mode switching operation is ended,
  wherein the mode switching operation occurs when a rotation angle of a cam member is switched between:
    a spin-drying mode angle in a spin-drying mode, in which the coupling is coupled to the main motor, and a washing mode angle in a washing mode, in which the coupling is decoupled from the main motor, or
    the washing mode angle in the washing mode and the spin-drying mode angle in the spin-drying mode.

2. The washing apparatus according to claim 1, wherein the controller is further configured to rotate the main motor at a point of time after a predetermined washing switching delay time from a point of time when mode switching from the spin-drying mode to the washing mode is started.

3. The washing apparatus according to claim 1, wherein the controller is further configured to rotate the main motor at a point of time after a predetermined spin-drying switching delay time from a point of time when mode switching from the washing mode to the spin-drying mode is started.

4. The washing apparatus according to claim 1, wherein:
  the washing apparatus further comprises:

the cam member provided at the clutch motor and configured to rotate together with the clutch motor; and a connection member connected to the cam member and the clutch lever and configured to transmit the tensile force of the clutch motor to the clutch lever, and the connection member moves farther from the coupling by rotation of the clutch motor in the mode switching operation from the spin-drying mode to the washing mode and moves closer to the coupling by rotation of the clutch motor in the mode switching operation from the washing mode to the spin-drying mode.

5. The washing apparatus according to claim 4, wherein:
the washing apparatus further comprises a sensor configured to sense a rotation angle of the cam member, and
the controller is further configured to determine a point of time to rotate the main motor based on an output signal from the sensor.

6. The washing apparatus according to claim 5, wherein the controller is further configured to rotate the main motor at a predetermined time period after the sensor outputs an ON signal.

7. The washing apparatus according to claim 5, wherein the controller is configured to rotate the main motor at a predetermined time period after the sensor is turned off.

8. The washing apparatus according to claim 1, wherein the coupling is coupled to the main motor in the spin-drying mode to transmit the rotational force of the main motor to the spin-drying shaft.

9. The washing apparatus according to claim 8, wherein:
the washing apparatus further comprises a rotation preventer located above the coupling, and
the coupling is decoupled from the main motor and moves upward by the clutch lever to be coupled to the rotation preventer in the washing mode.

10. The washing apparatus according to claim 1, wherein the controller is further configured to rotate the main motor during the mode switching operation in a direction opposite to a rotation direction immediately before the mode switching operation is started.

11. A method of controlling a washing apparatus, the method comprising:
generating a rotational force using a main motor;
providing the rotational force from the main motor to a washing shaft;
selectively transmitting the rotational force of the main motor to a spin-drying shaft by vertically moving a coupling disposed above the main motor;
generating a tensile force in a radial direction of the coupling using a clutch motor;
moving the coupling upward with a clutch lever using the tensile force of the clutch motor;
rotating the clutch motor to switch a driving mode of the washing apparatus from a spin-drying mode to a washing mode or from the washing mode to the spin-drying mode; and
rotating the main motor in at least a part of a mode switching operation of switching a cam member from the spin-drying mode, in which the coupling is coupled to the main motor, to the washing mode, in which the coupling is decoupled to the main motor, or from the washing mode to the spin-drying mode, wherein a rotation of the main motor is continuously maintained in a single direction through an end of the mode switching operation and a predetermined time period after the mode switching operation is ended.

12. The method according to claim 11, wherein rotating the main motor comprises rotating the main motor at a predetermined washing switching delay time after mode switching from the spin-drying mode to the washing mode is started.

13. The method according to claim 11, wherein rotating the main motor comprises rotating the main motor at a predetermined spin-drying switching delay time after mode switching from the washing mode to spin-drying mode is started.

14. The method according to claim 11, further comprising:
rotating the cam member provided at the clutch motor together with the clutch motor; and
transmitting the tensile force of the clutch motor to the clutch lever using a connection member connected to the cam member and the clutch lever,
wherein rotating the clutch motor comprises moving the connection member farther from the coupling by rotating the clutch motor in the mode switching operation from the spin-drying mode to the washing mode.

15. The method according to claim 14, wherein rotating the clutch motor comprises moving the connection member closer to the coupling by rotating the clutch motor in the mode switching operation from the washing mode to the spin-drying mode.

16. The method according to claim 14, wherein rotating the main motor comprises determining a point of time to rotate the main motor based on an output signal from a sensor configured to sense a rotation angle of the cam member.

17. The method according to claim 16, wherein rotating the main motor comprises rotating the main motor at a predetermined time period after the sensor outputs an ON signal.

18. The method according to claim 11, wherein rotating the main motor comprises rotating the main motor in a direction opposite to a rotation direction immediately before the mode switching operation is started.

\* \* \* \* \*